(12) United States Patent
Sampath et al.

(10) Patent No.: US 8,325,644 B2
(45) Date of Patent: Dec. 4, 2012

(54) MIXED MODE PREAMBLE DESIGN FOR SIGNALING NUMBER OF STREAMS PER CLIENT

(75) Inventors: Hemanth Sampath, San Diego, CA (US); Richard Van Nee, Breukelen (NL); Albert Van Zeist, Breukelen (NL); Geert Arnout Awater, Utrecht (NL)

(73) Assignee: QUALCOMM Incorporated, San Diego, CA (US)

( * ) Notice: Subject to any disclaimer, the term of this patent is extended or adjusted under 35 U.S.C. 154(b) by 379 days.

(21) Appl. No.: 12/684,258

(22) Filed: Jan. 8, 2010

(65) Prior Publication Data

US 2011/0110454 A1 May 12, 2011

Related U.S. Application Data

(60) Provisional application No. 61/259,065, filed on Nov. 6, 2009, provisional application No. 61/260,452, filed on Nov. 12, 2009.

(51) Int. Cl.
*H04W 4/18* (2009.01)
(52) U.S. Cl. ...... 370/312; 370/338; 370/349; 370/395.3
(58) Field of Classification Search ............. None
See application file for complete search history.

(56) References Cited

U.S. PATENT DOCUMENTS

| | | | |
|---|---|---|---|
| 2004/0208151 A1* | 10/2004 | Haverinen et al. | 370/338 |
| 2005/0220208 A1* | 10/2005 | Aoki | 375/267 |
| 2007/0286124 A1 | 12/2007 | Grant et al. | |
| 2008/0192622 A1* | 8/2008 | Scheim et al. | 370/210 |
| 2010/0002705 A1* | 1/2010 | Takatori | 370/395.3 |
| 2011/0002319 A1* | 1/2011 | Husen et al. | 370/338 |
| 2012/0020261 A1* | 1/2012 | Van Zelst et al. | 370/310 |

FOREIGN PATENT DOCUMENTS

| | | |
|---|---|---|
| EP | 1821477 A2 | 8/2007 |
| WO | WO2008103313 | 8/2008 |
| WO | WO2009023863 A1 | 2/2009 |
| WO | WO2009027931 A2 | 3/2009 |
| WO | WO2009109894 A1 | 9/2009 |

OTHER PUBLICATIONS

International Search Report and Written Opinion—PCT/US2010/055503—ISA/EPO—May 30, 2011.
BROADCOM, "802.11ac Preamble Proposal" PowerPoint Presentation, Nov. 4, 2009, 13 slides.

* cited by examiner

*Primary Examiner* — Chi H. Pham
*Assistant Examiner* — Shick Hom
(74) *Attorney, Agent, or Firm* — Dang M. Vo

(57) ABSTRACT

Certain aspects of the present disclosure present a technique for designing a signal (SIG) field of a mixed mode preamble transmitted to a plurality of user terminals. The SIG field can signal a number of spatial streams assigned to each user. The SIG field is designed such that a robust interference cancellation can be achieved at each user terminal.

99 Claims, 11 Drawing Sheets

| | | | | | | | | | | | | | | | |
|---|---|---|---|---|---|---|---|---|---|---|---|---|---|---|---|
| 0 | 0 | 0 | 0 | 0 | 0 | 0 | 0 | | 4 | 0 | 0 | 0 | 0 | 0 | 0 |
| 1 | 0 | 0 | 0 | 0 | 0 | 0 | 0 | | 4 | 1 | 0 | 0 | 0 | 0 | 0 |
| 1 | 1 | 0 | 0 | 0 | 0 | 0 | 0 | | 4 | 1 | 1 | 0 | 0 | 0 | 0 |
| 1 | 1 | 1 | 0 | 0 | 0 | 0 | 0 | | 4 | 1 | 1 | 1 | 0 | 0 | 0 |
| 1 | 1 | 1 | 1 | 0 | 0 | 0 | 0 | | 4 | 1 | 1 | 1 | 1 | 0 | 0 |
| 1 | 1 | 1 | 1 | 1 | 0 | 0 | 0 | | 4 | 2 | 0 | 0 | 0 | 0 | 0 |
| 1 | 1 | 1 | 1 | 1 | 1 | 0 | 0 | | 4 | 2 | 1 | 0 | 0 | 0 | 0 |
| 1 | 1 | 1 | 1 | 1 | 1 | 1 | 0 | | 4 | 2 | 1 | 1 | 0 | 0 | 0 |
| 1 | 1 | 1 | 1 | 1 | 1 | 1 | 1 | | 4 | 2 | 2 | 0 | 0 | 0 | 0 |
| 2 | 0 | 0 | 0 | 0 | 0 | 0 | | | 4 | 3 | 0 | 0 | 0 | 0 | 0 |
| 2 | 1 | 0 | 0 | 0 | 0 | 0 | | | 4 | 3 | 1 | 0 | 0 | 0 | 0 |
| 2 | 1 | 1 | 0 | 0 | 0 | 0 | | | 4 | 4 | 0 | 0 | 0 | 0 | 0 |
| 2 | 1 | 1 | 1 | 0 | 0 | 0 | | | 5 | 0 | 0 | 0 | 0 | 0 | 0 |
| 2 | 1 | 1 | 1 | 1 | 0 | 0 | | | 5 | 1 | 0 | 0 | 0 | 0 | 0 |
| 2 | 1 | 1 | 1 | 1 | 1 | 0 | | | 5 | 1 | 1 | 0 | 0 | 0 | 0 |
| 2 | 1 | 1 | 1 | 1 | 1 | 1 | | | 5 | 1 | 1 | 1 | 0 | 0 | 0 |
| 2 | 2 | 0 | 0 | 0 | 0 | 0 | | | 5 | 2 | 0 | 0 | 0 | 0 | 0 |
| 2 | 2 | 1 | 0 | 0 | 0 | 0 | | | 5 | 2 | 1 | 0 | 0 | 0 | 0 |
| 2 | 2 | 1 | 1 | 0 | 0 | 0 | | | 5 | 3 | 0 | 0 | 0 | 0 | 0 |
| 2 | 2 | 1 | 1 | 1 | 0 | 0 | | | 6 | 0 | 0 | 0 | 0 | 0 | 0 |
| 2 | 2 | 1 | 1 | 1 | 1 | 0 | | | 6 | 1 | 0 | 0 | 0 | 0 | 0 |
| 2 | 2 | 2 | 0 | 0 | 0 | 0 | | | 6 | 1 | 1 | 0 | 0 | 0 | 0 |
| 2 | 2 | 2 | 1 | 0 | 0 | 0 | | | 6 | 2 | 0 | 0 | 0 | 0 | 0 |
| 2 | 2 | 2 | 1 | 1 | 0 | 0 | | | 7 | 0 | 0 | 0 | 0 | 0 | 0 |
| 2 | 2 | 2 | 2 | 0 | 0 | 0 | | | 7 | 1 | 0 | 0 | 0 | 0 | 0 |
| 3 | 0 | 0 | 0 | 0 | 0 | 0 | | | 8 | 0 | 0 | 0 | 0 | 0 | 0 |
| 3 | 1 | 0 | 0 | 0 | 0 | 0 | | | | | | | | | |
| 3 | 1 | 1 | 0 | 0 | 0 | 0 | | | | | | | | | |
| 3 | 1 | 1 | 1 | 0 | 0 | 0 | | | | | | | | | |
| 3 | 1 | 1 | 1 | 1 | 0 | 0 | | | | | | | | | |
| 3 | 1 | 1 | 1 | 1 | 1 | 0 | | | | | | | | | |
| 3 | 2 | 0 | 0 | 0 | 0 | 0 | | | | | | | | | |
| 3 | 2 | 1 | 0 | 0 | 0 | 0 | | | | | | | | | |
| 3 | 2 | 1 | 1 | 0 | 0 | 0 | | | | | | | | | |

| Encoding | Efficiency | Simplicity | Legibility | Encoder requires | Decoder requires |
|---|---|---|---|---|---|
| I | Poor | High | Good | S | S |
| II | Good | Medium | Good | none | None* |
| III | Optimal | Low | none | N and S** | N and S |

MIXED MODE PREAMBLE DESIGN FOR SIGNALING NUMBER OF STREAMS PER CLIENT

CLAIM OF PRIORITY UNDER 35 U.S.C. §119

The present application for patent claims benefit of Provisional Application Ser. No. 61/259,065 filed Nov. 6, 2009 and Provisional Application Ser. No. 61/260,452 filed Nov. 12, 2009, and assigned to the assignee hereof and hereby expressly incorporated by reference herein.

BACKGROUND

1. Field

Certain aspects of the present disclosure generally relate to wireless communications and, more particularly, to a method of designing a signal (SIG) field of a transmission preamble for signaling number of spatial streams per client combinations.

2. Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO wireless system employs a number ($N_T$) of transmit antennas and a number ($N_R$) of receive antennas for data transmission. A MIMO channel formed by the $N_T$ transmit and $N_R$ receive antennas may be decomposed into $N_S$ spatial streams, where, for all practical purposes, $N_S \leq \min\{N_T, N_R\}$. The $N_S$ spatial streams may be used to transmit $N_S$ independent data streams to achieve greater overall throughput.

In wireless networks with a single Access Point (AP) and multiple user stations (STAs), concurrent transmissions may occur on multiple channels toward different stations, both in the uplink and downlink direction. Many challenges are present in such systems.

Robust multi-user (MU) MIMO reception requires that the AP transmits all training sequences to the user STAs. The training sequences allow each STA to estimate a channel from all AP antennas to the STA's antennas. The STAs use the channel from all AP antennas to perform effective interference nulling from MU-MIMO streams corresponding to other user STAs. In order to perform robust interference cancellation at each of the STAs, each STA is required to know which spatial stream(s) belong to the STA and which spatial stream(s) belong to other STAs in the network.

SUMMARY

Certain aspects provide a method for wireless communications. The method generally includes generating a signal (SIG) field of a preamble, wherein the SIG field comprises a plurality of bits that indicates a number of spatial streams allocated to a plurality of apparatuses without explicitly identifying each apparatus, and transmitting the preamble to the apparatuses.

Certain aspects provide an apparatus for wireless communications. The apparatus generally includes a first circuit configured to generate a preamble comprising a signal (SIG) field, wherein the SIG field comprises a plurality of bits that indicate a number and allocation of spatial streams for a plurality of other apparatuses without explicitly identifying each of the other apparatuses, and a transmitter configured to transmit the preamble to the other apparatuses.

Certain aspects provide an apparatus for wireless communications. The apparatus generally includes means for generating a preamble comprising a signal (SIG) field, wherein the SIG field comprises a plurality of bits that indicate a number and allocation of spatial streams for a plurality of other apparatuses without explicitly identifying each of the other apparatuses, and means for transmitting the preamble to the other apparatuses.

Certain aspects provide a computer-program product for wireless communications. The computer-program product includes a computer-readable medium comprising instructions executable to generate a preamble comprising a signal (SIG) field, wherein the SIG field comprises a plurality of bits that indicate a number and allocation of spatial streams for a plurality of apparatuses without explicitly identifying each apparatus, and transmit the preamble to the apparatuses.

Certain aspects provide an access point. The access point generally includes at least one antenna, a first circuit configured to generate a preamble comprising a signal (SIG) field, wherein the SIG field comprises a plurality of bits that indicate a number and allocation of spatial streams for a plurality of wireless nodes without explicitly identifying each wireless node, and a transmitter configured to transmit the preamble to the wireless nodes via the at least one antenna.

Certain aspects provide a method for wireless communications. The method generally includes receiving, at an apparatus, a signal (SIG) field within a preamble transmitted to the apparatus and to other apparatuses, wherein the SIG field comprises a plurality of bits that indicates a number of spatial streams allocated to a plurality of apparatuses without explicitly identifying each apparatus, and determining, based on the plurality of bits, which spatial streams are allocated to the apparatus.

Certain aspects provide an apparatus for wireless communications. The apparatus generally includes a receiver configured to receive a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus, and a circuit configured to determine, based on the plurality of bits, which spatial streams are allocated to the apparatus.

Certain aspects provide an apparatus for wireless communications. The apparatus generally includes means for receiving a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus, and means for determining, based on the plurality of bits, which spatial streams are allocated to the apparatus.

Certain aspects provide a computer-program product for wireless communications. The computer-program product includes a computer-readable medium comprising instructions executable to receive, at an apparatus, a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus, and determine, based on the plurality of bits, which spatial streams are allocated to the apparatus.

Certain aspects provide a wireless node. The wireless node generally includes at least one antenna, a receiver configured to receive, via the at least one antenna, a preamble transmitted to the wireless node and to other wireless nodes, said preamble comprising a signal (SIG) field, wherein the SIG field comprises a plurality of bits that indicate a number and allocation of spatial streams for a plurality of wireless nodes without explicitly identifying each wireless node, and a circuit configured to determine, based on the plurality of bits, which spatial streams are allocated to the wireless node.

Certain aspects provide a method for wireless communications. The method generally includes generating, at an apparatus, a frame comprising a plurality of identifiers (IDs), wherein the plurality of IDs are assigned to a plurality of apparatuses, and transmitting the frame to the apparatuses.

Certain aspects provide an apparatus for wireless communications. The apparatus generally includes a circuit configured to generate a frame comprising a plurality of identifiers (IDs), wherein the plurality of IDs are assigned to a plurality of apparatuses, and a transmitter configured to transmit the frame to the apparatuses.

Certain aspects provide an apparatus for wireless communications. The apparatus generally includes means for generating, at an apparatus, a frame comprising a plurality of identifiers (IDs), wherein the plurality of IDs are assigned to a plurality of apparatuses, and means for transmitting the frame to the apparatuses.

Certain aspects provide a computer-program product for wireless communications. The computer-program product includes a computer-readable medium comprising instructions executable to generate, at an apparatus, a frame comprising a plurality of identifiers (IDs), wherein the plurality of IDs are assigned to a plurality of apparatuses, and transmit the frame to the apparatuses.

Certain aspects provide an access point. The access point generally includes at least one antenna, a circuit configured to generate a frame comprising a plurality of identifiers (IDs), wherein the plurality of IDs are assigned to a plurality of wireless nodes, and a transmitter configured to transmit the frame to the wireless nodes via the at least one antenna.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 8 illustrates example combinations of numbers of spatial streams allocated to different users in accordance with certain aspects of the present disclosure.

FIGS. 9A-9F illustrate examples of different resource allocations and corresponding codes in accordance with certain aspects of the present disclosure.

DETAILED DESCRIPTION

Figure 1:
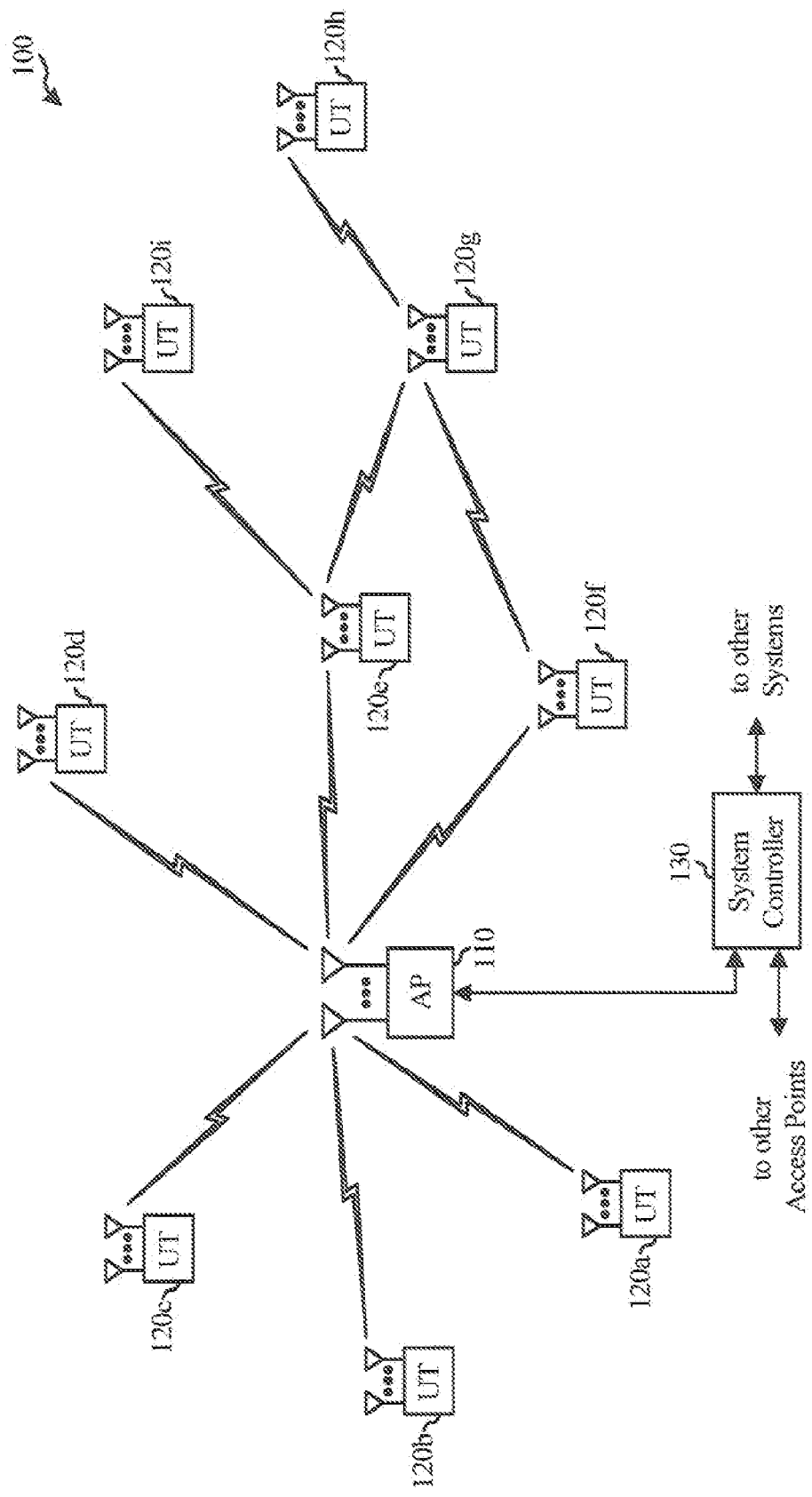
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
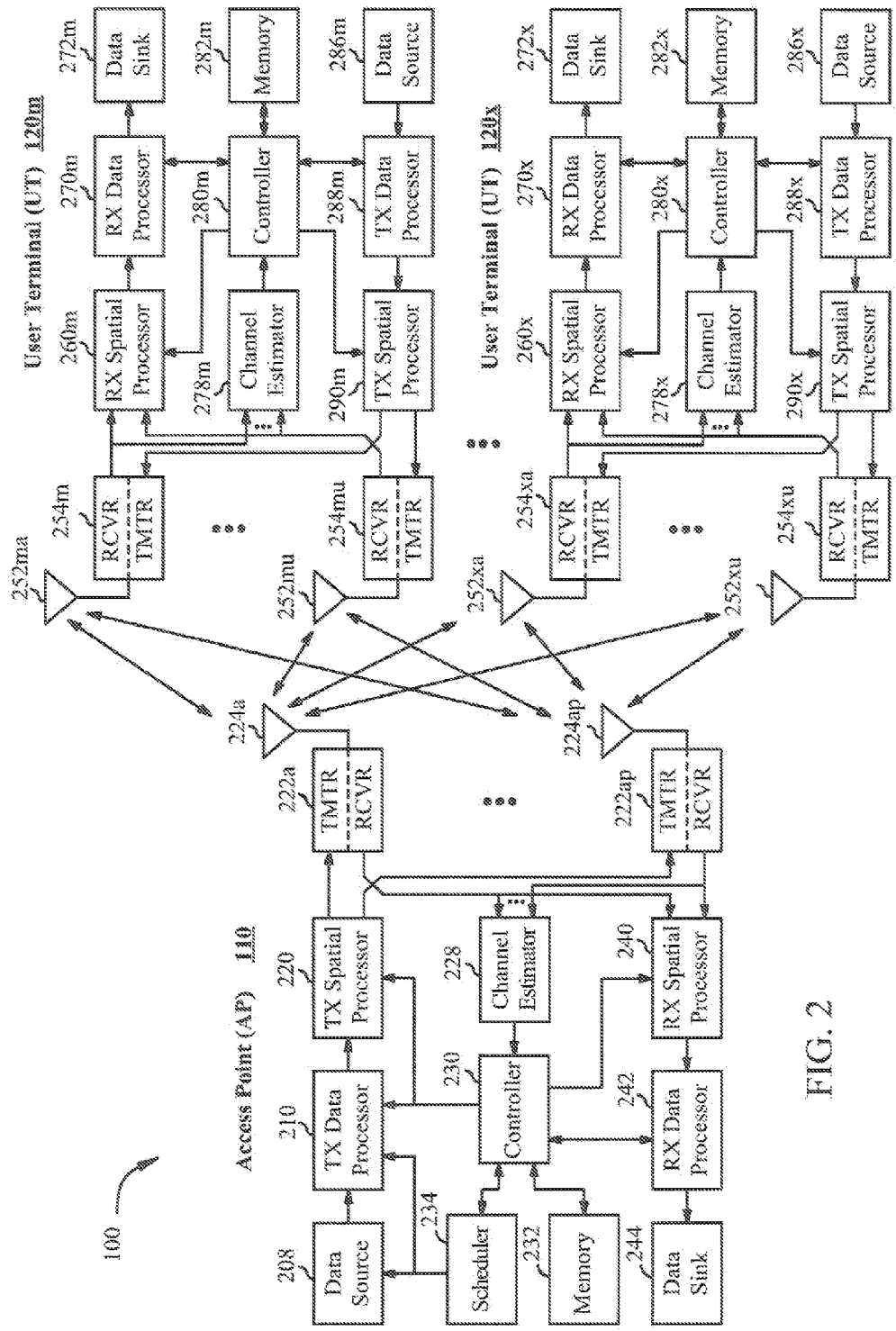
FIG. 2 illustrates a block diagram of an example access point and user terminals in accordance with certain aspects of the present disclosure.

FIG. 2 illustrates a block diagram of access point 110 and two user terminals 120*m* and 120*x* in MIMO system 100. The access point 110 is equipped with $N_t$ antennas 224*a* through 224*t*. User terminal 120*m* is equipped with $N_{ut,m}$ antennas 252*ma* through 252*mu*, and user terminal 120*x* is equipped with $N_{ut,x}$ antennas 252*xa* through 252*xu*. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224*a* through 224*ap* receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
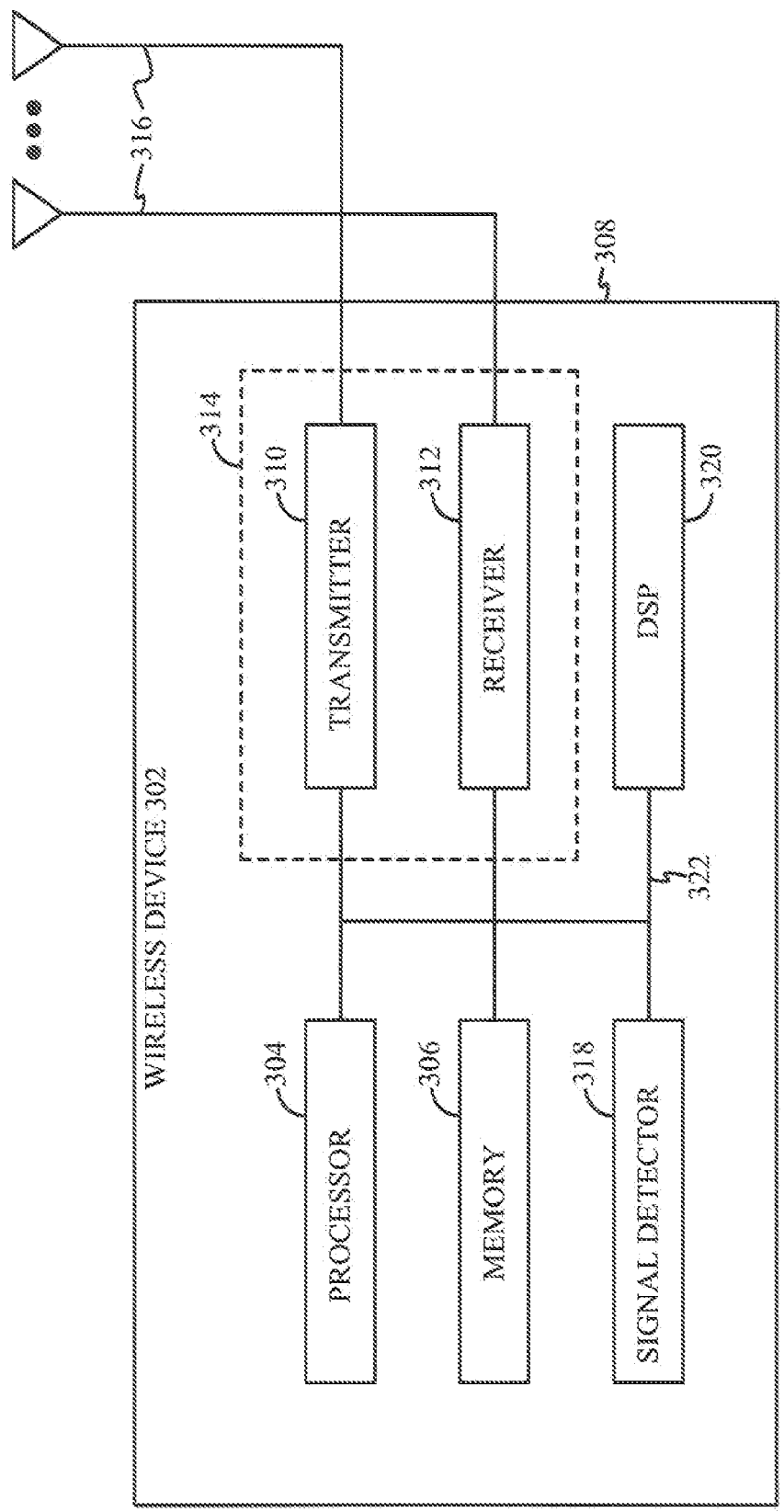
FIG. 3 illustrates a block diagram of an example wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may be a base station 104 or a user terminal 106.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314.

The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Design of High Throughput Preamble for Robust Interference Cancellation

Certain aspects of the present disclosure support designing a Very High Throughput Signal (VHT-SIG) field of a preamble. The preamble may be transmitted, for example, from the access point (AP) 110 to the users 120 in the wireless network 100 illustrated in FIG. 1. The proposed design of the VHT-SIG field may allow users to distinguish its own spatial stream(s) from spatial streams dedicated to other users in order to perform robust interference cancellation.

Figure 4:
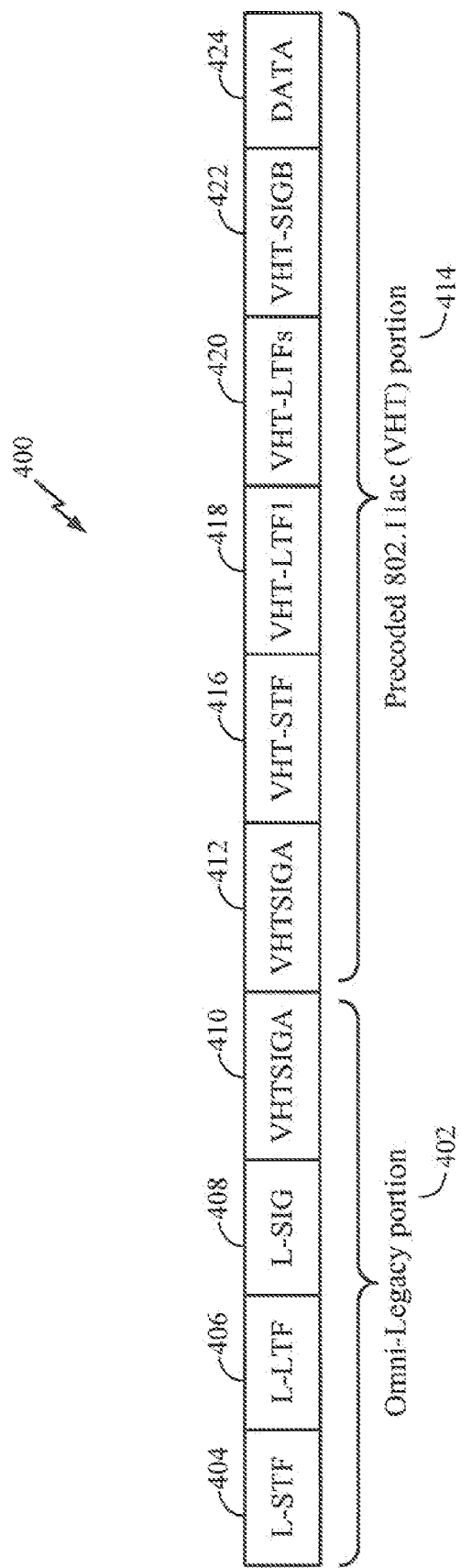
FIG. 4 illustrates an example mixed mode preamble in accordance with certain aspects of the present disclosure.

FIG. 4 illustrates an example of a mixed mode preamble 400 in accordance with certain aspects of the present disclosure. The preamble 400 may comprise an omni-legacy portion 402 and a precoded 802.11 ac VHT portion 414. The legacy portion 402 may comprise: a Legacy Short Training Field (L-STF) 404, a Legacy Long Training Field 406, a Legacy Signal (L-SIG) field 408, and two OFDM symbols 410-412 for Very High Throughput Signal A (VHT-SIGA) fields. The VHT-SIGA fields 410-412 may be transmitted omni-directionally. The precoded 802.11ac VHT portion 414 may comprise: a Very High Throughput Short Training Field (VHT-STF) 416, a Very High Throughput Long Training Field 1 (VHT-LTF1) 418, Very High Throughput Long Training Fields (VHT-LTFs) 420, a Very High Throughput Signal B (VHT-SIGB) field 422, and a data packet 424. The VHT-SIGB field may comprise one OFDM symbol and may be transmitted precoded/beamformed.

Robust multi-user (MU) MIMO reception may require that the AP transmits all VHT-LTFs 420 to all supported users. The VHT-LTFs 420 may allow each user to estimate a MIMO channel from all AP antennas to the user antennas. The user may utilize the estimated channel to perform effective interference nulling from MU-MIMO streams corresponding to other users. To perform robust interference cancellation, each client may be required to know which spatial stream belongs to the client, and which spatial streams belong to other users.

One possible solution is to specify the spatial stream identification (ID) and Media Access Control Identification (MACID) within the VHT-SIGA symbols 410-412 for each user station (STA). However, a number of required bits may be significant. For example, for the MACID of six bytes and the spatial stream ID of three bits (for the exemplary case of eight transmit AP antennas), this may result into 51 bits per client, which may be approximately 400 bits for eight clients. It is not possible to signal this amount of bits in two OFDM symbols of the VHT-SIGA fields 410-412. Certain aspects of the present disclosure support methods to efficiently signal information about a spatial stream offset of each user utilizing substantially smaller number of bits within the VHT-SIGA field.

In one aspect of the present disclosure, the AP may provide each 802.11ac user in the network with a userID=(1, STAID mod U), where U represents a maximum number of users per downlink SDMA transaction (e.g., may be equal to the number of AP antennas). For example, the value of U may be equal to eight. The STAID may be provided during association time or using an explicit management frame. It should be noted that in a heavily loaded network more than one STA may have the same STAID. Also, each STA may have multiple STAIDs for different application classes and profiles, e.g. video streaming, best effort data, and so on.

Therefore, the AP may not be able to schedule two STAs with identical STAID in the same epoch. Also, the AP may not be able to schedule two users from different application classes or profiles in the same time epoch. It should be noted that for most applications, e.g. home entertainment, this may not result in any performance degradation since the number of STAs in a home is typically not greater than eight.

In the VHT-SIGA fields 410-412, the AP may only signal the spatial stream offset of each user in a particular order (e.g., according to the STAID value). For example, the sequence (3,2,1) within the VHT-SIGA may indicate that userID 1 may get first three spatial streams, userID 2 may get next two spatial streams, and userID 3 may get the next one spatial stream. Therefore, in the exemplary case of eight supported users and up to eight spatial streams (i.e., spatial stream index of three bits), 24 bits of the VHT-SIGA field may be required to signal the spatial stream offset for each user. This is substantially smaller than approximately 400 bits reported earlier.

The proposed approach may impose restrictions on scheduler since two users with the same STAID may not be scheduled. However, for most of applications, e.g. home entertainment, this is acceptable.

In another aspect of the present disclosure, the number of bits of the VHT-SIGA field indicating spatial stream offsets for all users may be further reduced. In order to achieve this, some restrictions on spatial stream allocation may be applied (i.e., some compression may be utilized). In the exemplary case of eight users and up to eight spatial streams (i.e., the number of AP transmit antennas may be equal to eight), a sequence "0000" of bits within the VHT-SIGA field may, for example, indicate that each user may get one spatial stream. Furthermore, a sequence "0001" of the bits within the VHT-SIGA field may, for example, indicate that four users may get two spatial streams each, a sequence "0010" of the bits within the VHT-SIGA field may, for example, indicate that three users may get two spatial streams each, a sequence "0011" of the bits within the VHT-SIGA field may, for example, indicate that four users may get two spatial streams each, a sequence "0100" of the bits within the VHT-SIGA field may, for example, indicate that two users may get three spatial streams each, a sequence "0101" of the bits within the VHT-SIGA field may indicate that two users may get four spatial streams each, and so on.

By applying this approach, the total number of bits of the VHT-SIGA field used to indicate spatial stream offsets for all users may be substantially reduced. In the exemplary case of eight users and up to eight spatial streams, a total of four bits for the VHT-SIGA field may be sufficient. On the other hand, some additional restrictions on the AP scheduler may be imposed. However, this may not lead to any performance degradation.

Figure 5:
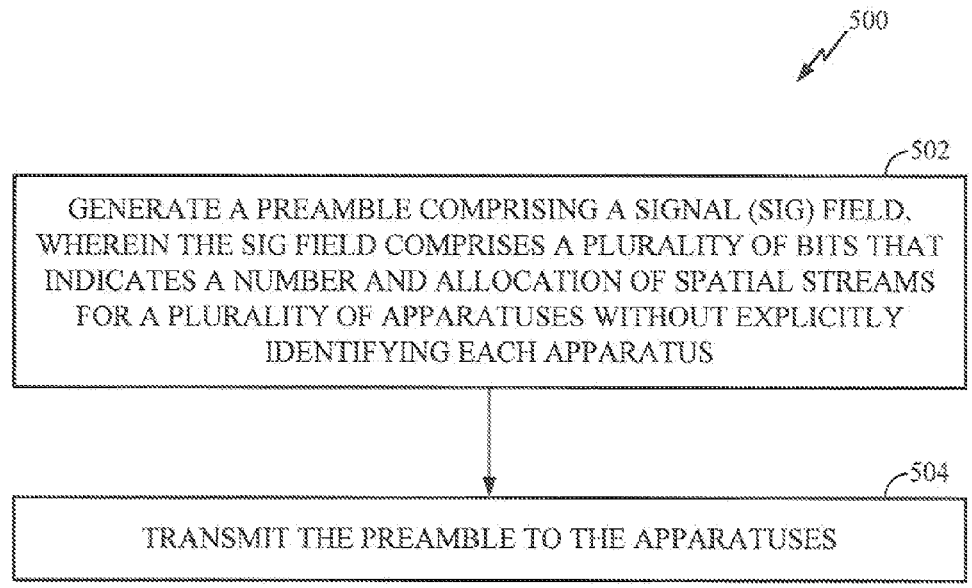
FIG. 5 illustrates example operations for generating a signal (SIG) field of the preamble in accordance with certain aspects of the present disclosure.

FIG. 5 illustrates example operations 500 for generating a SIG field of a preamble in accordance with certain aspects of the present disclosure. At 502, an apparatus (e.g., an access point) may generate the preamble comprising a SIG field, wherein the SIG field comprises a plurality of bits that indicate a number and allocation of spatial streams for a plurality of other apparatuses (e.g., user terminals) without explicitly identifying each apparatus. At 504, the apparatus may transmit the preamble to the other apparatuses.

Figure 6:
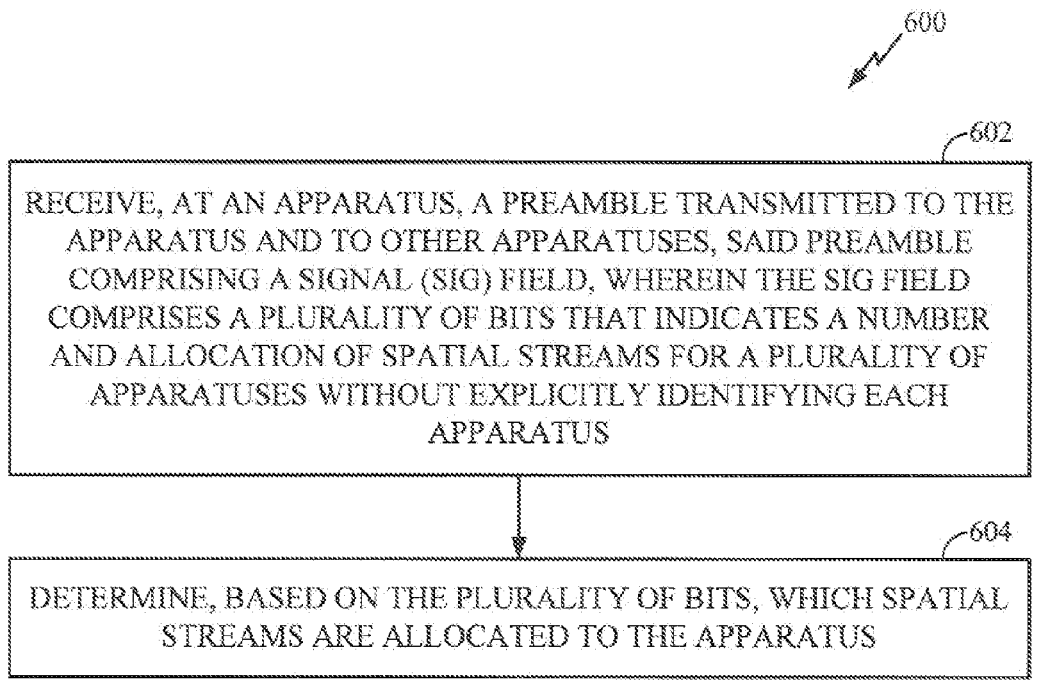
FIG. 6 illustrates example operations associated with reception of the preamble that may be executed at a user terminal in accordance with certain aspects of the present disclosure.

FIG. 6 illustrates example operations 600 associated with reception of the preamble that may be executed at a user terminal in accordance with certain aspects of the present disclosure. At 602, an apparatus (e.g., the user terminal) may receive a preamble transmitted to the apparatus and to other apparatuses (e.g., other user terminals), said preamble comprising a SIG field, wherein the SIG field comprises a plurality of bits that indicate a number and allocation of spatial streams for a plurality of apparatuses without explicitly identifying each apparatus. At 604, the apparatus may determine, based on the plurality of bits, which spatial streams are allocated to the apparatus. The apparatus may receive a packet on the spatial streams allocated to the apparatus, decode the received packet, and discarding the decoded packet, if a MAC address associated with the packet is different than a MAC address associated with the apparatus.

Figure 7:
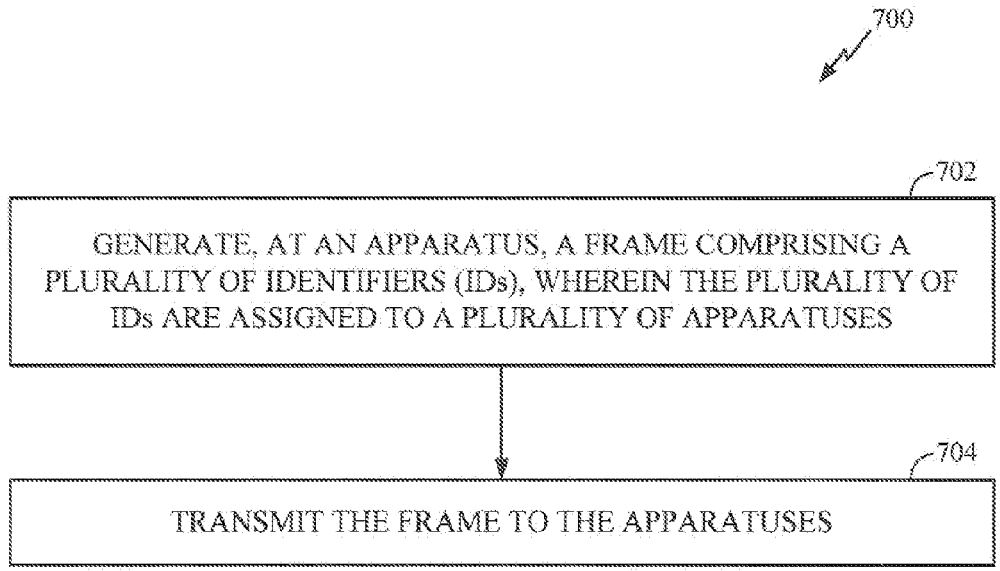
FIG. 7 illustrates example operations for assigning a plurality of user identifiers (IDs) to a plurality of users in accordance with certain aspects of the present disclosure.

FIG. 7 illustrates example operations 700 for assigning a plurality of user identifiers (IDs) to a plurality of users in accordance with certain aspects of the present disclosure. At 702, an apparatus (e.g., an access point) may generate a Management frame comprising a plurality of identifiers (IDs), wherein the plurality of IDs may be assigned to a plurality of other apparatuses (i.e., wireless nodes). At 704, the apparatus may transmit the Management frame to the other apparatuses. Certain aspects of the present disclosure support assigning of the plurality of IDs to the plurality of apparatuses during association procedures.

The plurality of IDs may comprise an identifier for each access class. Each of the IDs assigned to one of the apparatuses may be selected from a defined number of unique IDs, wherein the defined number of unique IDs may correspond to a maximum number of apparatuses simultaneously supported by a single downlink SDMA transmission originated from the apparatus. Furthermore, the Management frame may be re-transmitted in order to re-assign a different plurality of IDs to the apparatuses. The different plurality of IDs may be specified by a group ID.

IDs assigned to user STAs may be signaled in the group ID. The group IDs may be formed by the access point and may be transmitted within the Management frame. This frame may list the group IDs and their corresponding Association Identifiers (AIDs). An AID field may comprise 16 bits that every user may obtain in an Association Response frame. The AID may comprise an ID value from 1 to 2007, and therefore only 11 out of 16 bits may be effectively utilized.

In one aspect of the present disclosure, all possible combinations of number of spatial streams per user STA may be signaled in the VHT-SIGA field of the preamble. Those cases where a total number of spatial streams exceed a maximum number of streams that the access point can simultaneously support may be excluded and may not be signaled.

An exemplary case can be considered where the access point can support up to four simultaneous users and up to eight spatial streams in total. Then, possible number of streams per user combination can be, for example, {8,0,0,0}, {0,8,00}, {4,2,0,2}, {1,0,0,1}, {6,2,0,0}, {2,6,0,0} and so on. The total number of valid combinations for this example is 495. Therefore, at least 9 bits within the VHT-SIGA field may be required to signal all possible number of spatial streams per user combinations. If the maximum number of simultaneously supported users is increased to six, then the number of combinations increases to 3003, which means that 12 signaling bits within the VHT-SIGA field may be required. For up to eight simultaneously supported users, the number of combinations becomes 12870, which means that 14 signaling bits may be required.

In one aspect of the present disclosure, the group ID may be arranged such that the allocated number of spatial streams per user may always be in non-increasing order. Alternatively, the group ID may be arranged such that the allocated number of spatial streams per user may always be in non-decreasing order. The group ID may be changed when the order of the number of spatial streams per user changes. The group ID may be changed if the MIMO channel between the access point and user STAs has been changed significantly such that a different grouping of users may provide better throughput results. The changing rate for the group ID may be approximately same as the rate in which the number of spatial streams per client changes.

The exemplary case where the access point may simultaneously support up to four users with up to eight spatial streams can be again considered. Then, possible number of spatial streams per user combination can be, for example, {8,0,0,0}, {4,2,0,0}, {1,0,0,0}, {2,2,2,1} and so on. However, combinations like {0,8,0,0} or {4,0,0,1} may not be allowed by the group ID. Therefore, the total number of valid combinations may be now reduced to 53, and six bits of the VHT-SIGA field may be sufficient to signal all possible number of spatial streams per user combinations.

If, for example, the number of users is increased to eight, then the number of combinations may increase to 67. These combinations are illustrated in FIG. 8. However, all nine combinations from FIG. 8 that comprise only a single user with allocated spatial stream(s) may be excluded since these combinations may be signaled separately and not to be included in the multi-user MIMO signaling. Therefore, six signaling bits of the VHT-SIGA field may still be sufficient to represent 58 remaining possible combinations in the case of eight simultaneously supported users. Hence, by applying the proposed approach, it may be feasible to substantially increase the number of simultaneously supported user STAs in downlink multi-user MIMO systems, while not increasing the number of signaling bits within the VHT-SIGA field.

Encoding and Decoding Methods for Resource Allocation Codes

Different methods are proposed in the present disclosure to encode all possible allocations of S spatial streams to N user stations in a wireless SDMA system. As an example, there may be ten possible allocations of S=2 spatial streams to N=3 users as a set of ten tuples $(s_1,s_2,s_3)$ where $s_i$ denotes the number of streams allocated to user i. The sum of the tuple elements should be less than or equal to S, and elements should be non-negative integer numbers. The list of possible allocations is therefore: (0,0,0), (0,0,1), (0,0,2), (0,1,0), (0,1,1), (0,2,0), (1,0,0), (1,0,1), (1,1,0), and (2,0,0).

The encoding represents a numerical representation of a particular allocation of spatial streams. The encoding may be utilized to communicate a chosen allocation. For example, the access point in the SDMA system 100 may want to inform its associated stations how the spatial streams are assigned, so that the stations may prepare their receivers to correctly extract and decode the allocated streams in the following data packets that the access point will transmit. As mentioned above, this information may be embedded in a preamble that is prefixed to the data packet.

The primary requirement may be that the encoding of the resource allocation is efficient, i.e. to use the smallest possible amount of bits. In the context of the example, this may result in the smallest amount of signaling overhead. The overhead may need to be kept small because it takes capacity away from the actual payload traffic.

The secondary requirement may be that both encoding and decoding procedures are simple. This may result in a smaller and simpler transmitter and receiver circuitry and/or embedded software.

The third requirement may be that the decoding is simple enough to be immediately understandable by a human. This may be helpful for monitoring and interpreting SDMA traffic, as well as for debugging in case the communication system is not functioning correctly.

The abovementioned list of resource allocations represents a valid encoding itself. Three decimal numbers from the set $\{0,1,2\}$ may be required to describe all possible encodings. However, a restriction can be applied to use binary encoding schemes, which are more practical in the context of digital communication systems. It can be observed that the listed resource allocations may be encoded as three 2-bit numbers. Then, the total of six bits may be required to encode all ten resource allocations listed above.

In general, $N \times \lceil \log_2 S \rceil$ bits may be required to describe all allocations. In the N=3, S=2 example, the proposed encoding may not be efficient enough. The minimum number of bits to encode all ten possible allocations may be $\lceil \log_2 10 \rceil = 4$ bits. Therefore, the efficiency of this method may be equal to 4/6=67%.

The reason for the inefficiency is that some codewords may represent illegal allocation. For example, since S=2 it is not possible to assign three spatial streams to a single user. Therefore, codewords 11xxxx, xx11xx and xxxx11 cannot be used (bits labeled as 'x' can be either 0 or 1). Also, this particular encoding does not consider that the sum of the available resources is less than or equal to S. All codewords for which this condition is not met will remain unused.

On the other hand, this encoding approach may be simple to implement since it may only comprise the concatenation of the binary representation of the allocation tuples. The reverse process of decoding may be trivial as well. Furthermore, the code may be almost directly legible by human.

In another aspect of the present disclosure, the code can be defined by its encoding procedure. For each element in allocation tuple, output $s_i$ bits may be set to "1" and one output bit may be set to "0". The bit values "1" and "0" may be used the other way around, but the convention can be adopted that the value of "1" may represent a spatial stream and the value of "0" may be used as a separator symbol to delineate assignment between successive users. In the example where N=3, S=2, the possible resource allocations can be encoded as illustrated in FIG. 9A.

In general, since there may be N users, codewords may comprise N zero-bits. Since there may be up to S spatial streams to be assigned, the codewords may comprise up to S one-bits. The code may be therefore at most N+S bits long and at least N bits long. It can be observed that the proposed code may have a variable length.

Figures 9A, 9B:
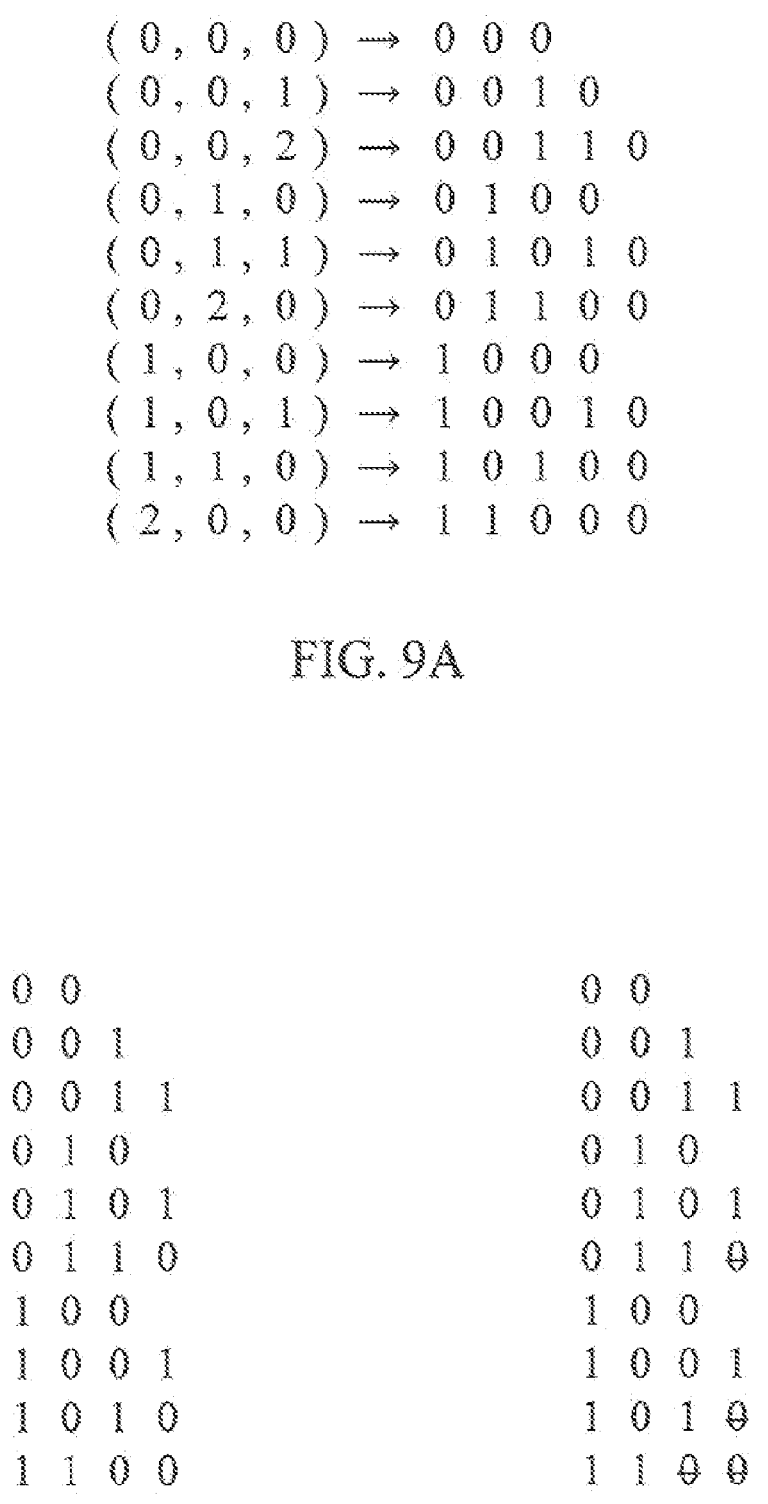

As it is apparent from both the encoding method and the exemplary list from FIG. 9A, the last bit of this code may be always zero. Therefore, this bit may not carry any information and may be omitted. This may reduce the maximum code length to N+S-1 bits. In the N=3, S=2 example, the list of codewords may become as illustrated in FIG. 9B.

If the decoder knows the value of S, the code may be shortened further by terminating the code after all available spatial streams have been assigned, i.e. when S one-bits have been expended. Thus, for the N=3, S=2 example, the list of codewords may become as illustrated in FIG. 9C. By applying this, the average codeword length may be decreased, but the maximum codeword length may remain the same.

Figures 9D, 9E, 9F:
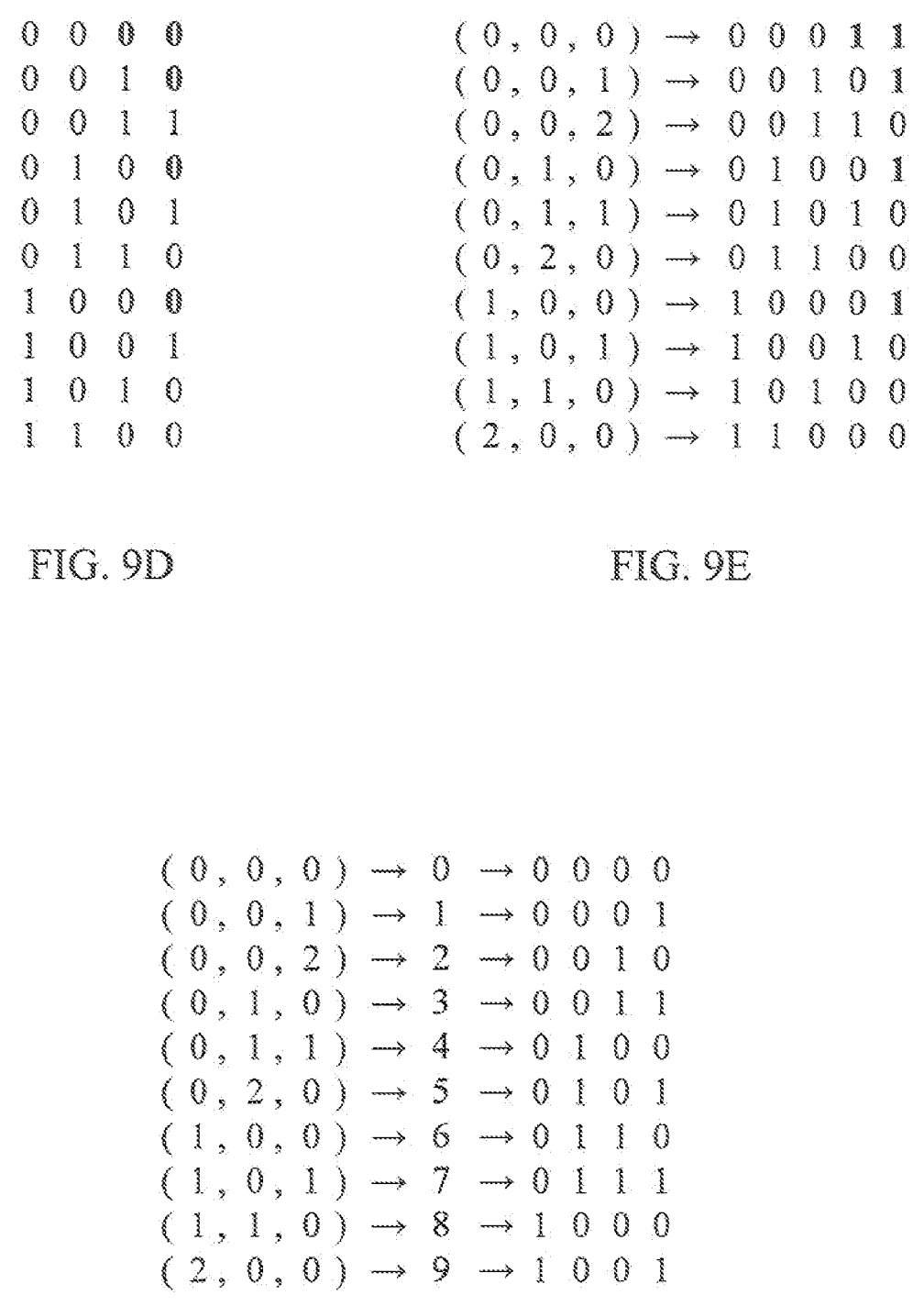

When (as it is generally the case) a fixed number of signaling bits is available, the original (unshortened) code may be extended to the desired length as illustrated in FIG. 9D. It may not be possible to use 1's for the code extension since that would result in ambiguous codewords. For example, the second and third code in the list from FIG. 9D may both become equal to $\{0\ 0\ 1\ 1\}$. This is because the zero-bits may be utilized as separators between users' assignments, and it is harmless to include an additional separator. On the other hand, the 1's may encode actual resources and adding a one-bit may change the allocation of the last user.

In the N=3, S=2 example, the code length N+S-1=4 happens to be equal to the theoretical minimum of four bits. In general this may not be true. To prove this, the required minimum amount of bits that may be needed in the general case is first calculated. It can be considered the original, unshortened, variable length code, but the code may be now extended with 1's to a length of N+S bits, as illustrated in FIG. 9E.

Every codeword may now comprise exactly S one-bits. This is because the 1's that are appended may represent the unassigned resources and the sum of the assigned and unassigned resources may be exactly equal to S. The number of zeroes in the code may be equal to N. The number of possible codewords may be thus equal to:

$$\binom{N+S}{N} = \frac{N+S}{N!S!}. \quad (1)$$

To encode all combinations, $\lceil \log_2(N+S)!/(N!S!) \rceil$ bits may be required. In the N=3, S=2 example, $5!/3!2!=(5\cdot4)/(2\cdot1)=10$ and $\lceil \log_2 10 \rceil =4$. In a different example when N=S=8, N+S-1=15, while $$\left\lceil \log_2\binom{N+S}{N} \right\rceil = \lceil \log_2 12870 \rceil = 14.$$

This may result in efficiency of 14/15=93%. However, this high efficiency may not always be achieved. For example, when N=8 and S=2, then N+S-1=9 and $$\left\lceil \log_2\binom{N+S}{N} \right\rceil = \lceil \log_2 45 \rceil = 6.$$

Therefore, the efficiency may be only 67%.

Figures 10, 11:
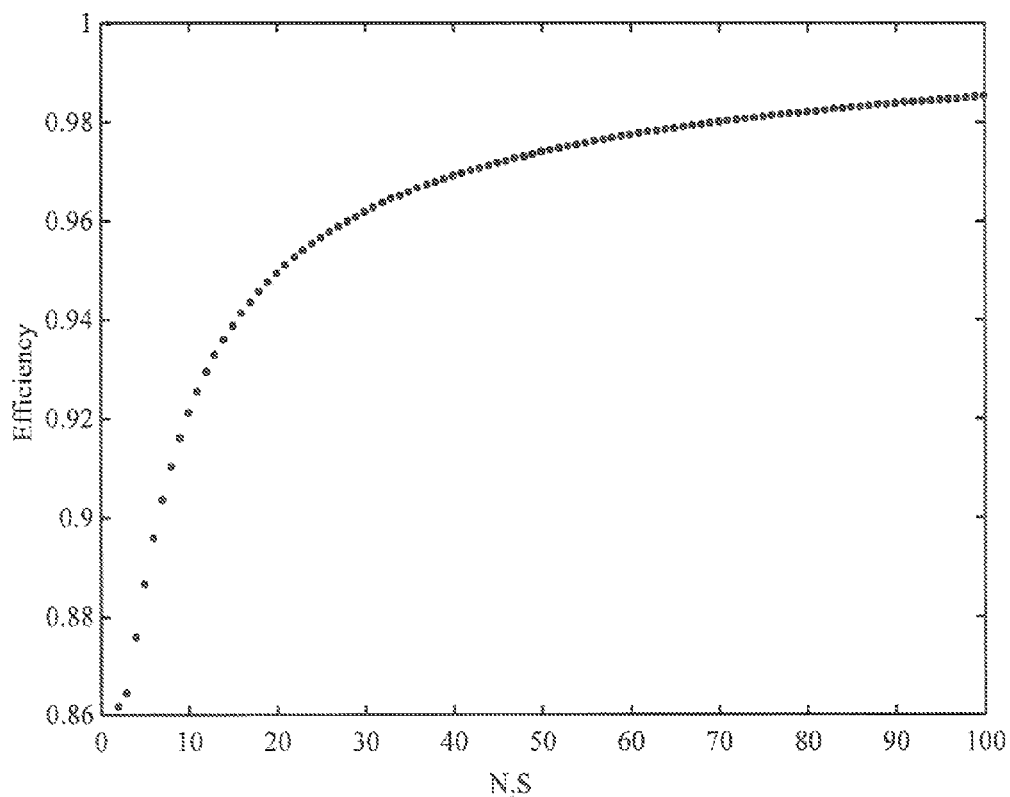
FIG. 10 illustrates an example efficiency of a resource allocation code in accordance with certain aspects of the present disclosure.
FIG. 11 illustrates example features of different codes representing resource allocations in accordance with certain aspects of the present disclosure.

It can be observed that this particular encoding method may be most efficient when N=S, with associated code length of 2N-1. When N=S, as N increases the efficiency of this code may approach 100%, as illustrated in FIG. 10.

Encoding and decoding simplicity of this particular code may be lower than those of the first encoding method. The encoding and decoding process may require serial parsing of the bit stream, and therefore it may be of higher complexity than the encoding of the first proposed code that may be performed for each user independently and in parallel. The legibility of the proposed code is good, and is arguably better than that of the first code since it involves counting series of 1's by 0's, instead of converting numbers from binary to decimal bases.

Yet another method for encoding spatial stream allocations may involve enumerating all possible assignments and representing the ordinal numbers in binary form, as illustrated in FIG. 9F. Clearly, efficiency is always 100%, but legibility is non-existent. However, coding and decoding may be implemented using a recursive algorithm.

To explain this encoding method (i.e., the proposed code III), it is beneficial to refer back to the second proposed code (i.e., the code II). Instead of considering all possible assignment tuples, it is equivalent to look at all possible codewords. In other words, the resource assignment to be encoded using the code III may be first translated into the code II.

The type II codeword may start with either a zero-bit or with a one-bit. A zero-bit may refer to the case when no resources are assigned to a first user. On the other hand, a one-bit may stand for a single spatial stream assigned to the first user. The remainder of the codeword may now be interpreted as a codeword for a reduced resource allocation problem.

In the first case when no resources are assigned to the first user, there may be N−1 available users with S spatial streams left. Therefore, there may be $$\binom{N+S-1}{S}$$

possibilities left for this case. In the second case when one spatial stream is assigned to the first user, there may be N available users with S−1 spatial streams left. Therefore, there may be $$\binom{N+S-1}{S-1}$$

possibilities for this remainder.

In the N=3, S=2 example, when the codeword starts with "0", then there may be $$\binom{4}{2} = 6$$

codewords left. When the codeword starts with "1", then there may be $$\binom{4}{1} = 4$$

codewords left. Indeed, in the list of allocation tuples there may be six allocations with zero resources assigned to the first user (the first six codewords in the list illustrated in FIG. 9F), and there may be four codewords (the remaining four items in the list of codewords illustrated in FIG. 9F) in which the first user has one or two resources assigned to it.

In the first case, the ordinal number may be in the range from 0 to 5, and in the second case the ordinal number may be in the range from 6 to 9. In the first case, the codewords may become 0 plus the ordinal value of the smaller type III code with N=2 and S=2. In the second case, the codewords may become 6 plus the ordinal value of the smaller type III code with N=2 and S=1.

The encoding procedure may be recursively implemented. The encoder may accept as input either the original code (see FIG. 9A), the shortened code (see FIG. 9B), the further shortened code (see FIG. 9C) or the extended type II code (see FIG. 9D). The decoding process may also be implemented recursively as the inverse procedure to the encoding method.

It can be observed that not all allocations of spatial streams are needed to be encoded. For example, the all-zero tuple may never be required in the SDMA application, and therefore it would not make sense to encode it. For type I and type II codes, this would mean that the all-zero codewords may be simply omitted. For the type III encoding, encoding 0 may be omitted or the ordinal numbers may be shifted such that the first used allocation has the ordinal value of 0.

The additional constraint in resource allocations can be to limit the number of spatial streams assigned to any user. In the context of the SDMA system, a single station may not be able to decode, for example, more than T spatial streams. Thus, the additional constraint may be that $s_i \leq T \leq S$. More generically, it may be possible to have a per-user constraint $s_i \leq T_i \leq S$.

Since this may limit the number of feasible allocations, the number of codewords may be smaller than the number of codewords in the codes described above. Obviously, the codes and their associated decoding and encoding methods may still be employed, while a certain number of codewords may simply remain unused. In certain aspects, this may be performed without impacting the number of codewords. For example, an SDMA system can be considered with N=4 users, S=8 spatial streams and up to four spatial streams per user, i.e. T=4. Without constraint (i.e., T=8) there may be 495 codewords, which may be encoded using the code III and $\lceil \log_2 495 \rceil = 9$ bits. When T=4, the number of feasible codes may be reduced to 355. However, $\lceil \log_2 355 \rceil = 9$ as well. Therefore, the code III may be used without loss of efficiency. The code II may also be used, but since it may require N+S−1=11 bits, it has a reduced efficiency of 82% since the per-user constraint of T spatial streams does not reduce the number of bits required for encoding.

The proposed encoding methods can be ranked according to the criteria of efficiency, simplicity and legibility, as illustrated in FIG. 11. It is also shown whether the corresponding encoder or decoder requires the knowledge of N, S or both. The asterisk symbol * in FIG. 11 represents the use of unshortened code from FIG. 9A. The shortened code may require the knowledge of S. The double asterisk symbol ** in FIG. 11 indicates that the values of N and S may be derived from the type II code, which may be used as an intermediate step in the encoding process. Therefore, the combination of the type II and type III encoder may not need any knowledge of S and N. However, this may not be possible for the decoder. For example, the cases N=6, S=2 and N=2, S=6 and N=3, S=2 and N=2, S=3, may all require four bits to encode. Therefore, from the code length itself the values of N and S may not be derived. Even the knowledge of either N or S may not be sufficient. For example, if it is known that the code length is four and S=2, then the value of N may still be four or three. Likewise, if it is known that the code length is four and N=2, then the value of S may still be three or four.

Figure 5A:
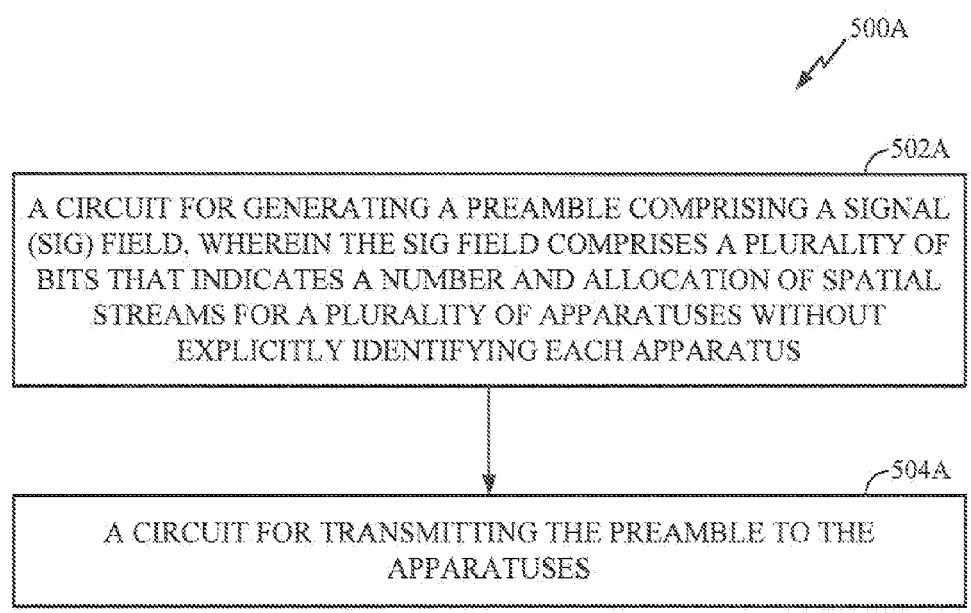
FIG. 5A illustrates example components capable of performing the operations shown in FIG. 5.
Figure 6A:
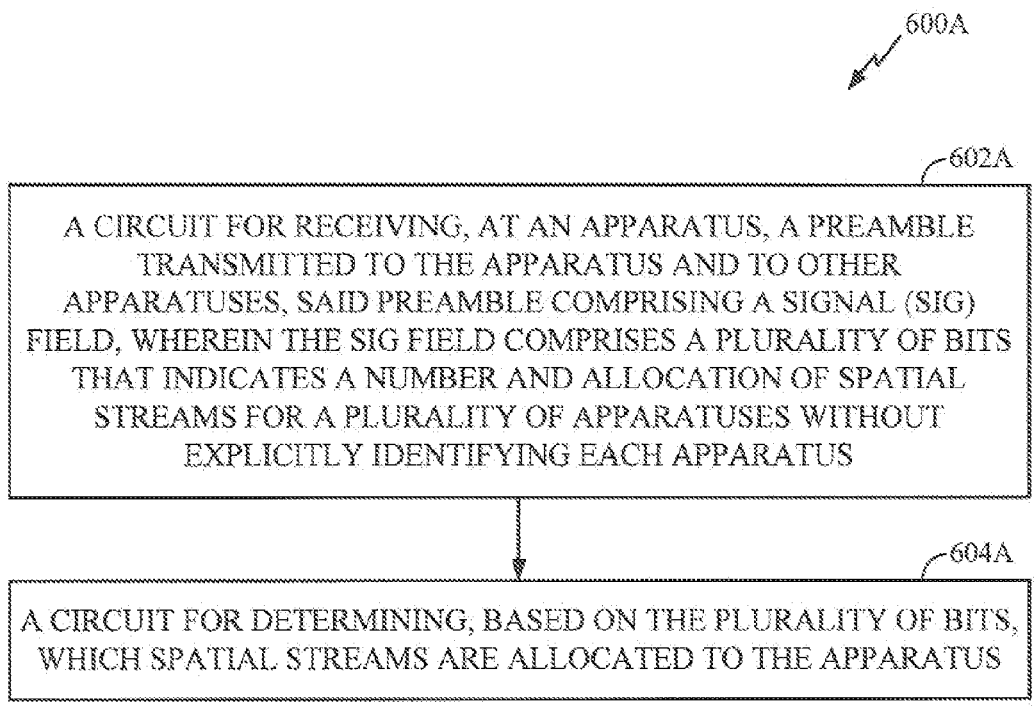
FIG. 6A illustrates example components capable of performing the operations shown in FIG. 6.
Figure 7A:
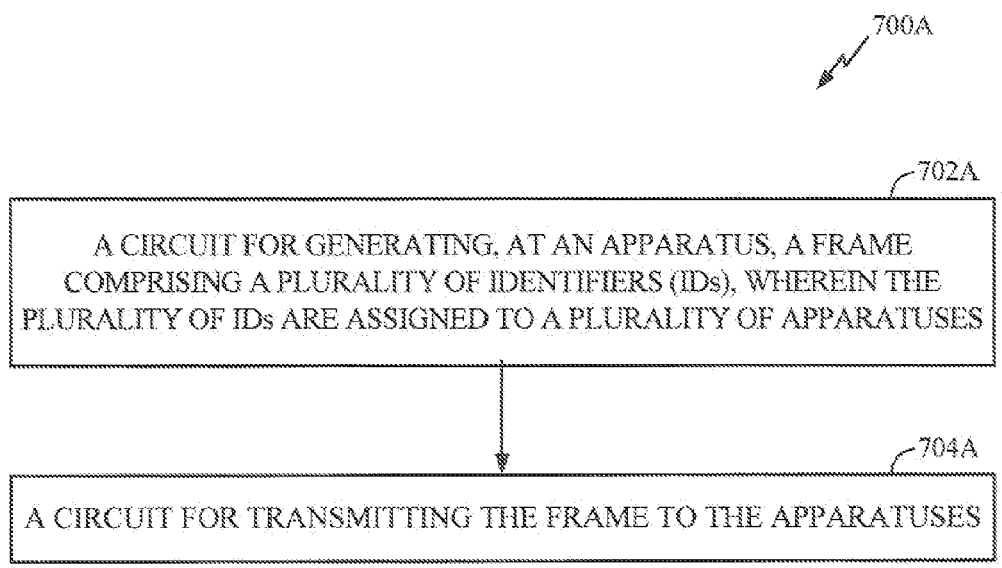
FIG. 7A illustrates example components capable of performing the operations shown in FIG. 7.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 500, 600 and 700, illustrated in FIGS. 5, 6 and 7 correspond to components 500A, 600A, and 700A illustrated in FIGS. 5A, 6A, and 7A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for wireless communications, comprising:
generating a preamble comprising a signal (SIG) field, wherein the SIG field comprises a plurality of bits that indicate a number and allocation of spatial streams for a plurality of apparatuses without explicitly identifying each apparatus;
assigning a subset of the plurality of bits to each apparatus, wherein the subset of bits assigned to each apparatus indicates a number of spatial streams allocated to that apparatus;
ordering the subsets of bits to enable each apparatus to identify its associated subset based on its location in the plurality of bits; and
transmitting the preamble to the apparatuses.

2. A method for wireless communications, comprising:
generating a preamble comprising a signal (SIG) field, wherein the SIG field comprises a plurality of bits that indicate a number and allocation of spatial streams for a plurality of apparatuses without explicitly identifying each apparatus; and
transmitting the preamble to the apparatuses, wherein
the plurality of bits represent a code,
different values of the code map to different combinations of numbers of spatial streams allocated to different numbers of the apparatuses, and
at least one code value maps to a same number of spatial streams allocated to each of the apparatuses.

3. A method for wireless communications, comprising:
generating a preamble comprising a signal (SIG) field, wherein the SIG field comprises a plurality of bits that indicate a number and allocation of spatial streams for a plurality of apparatuses without explicitly identifying each apparatus; and
transmitting the preamble to the apparatuses, wherein
the plurality of bits represent a code,
different values of the code map to different combinations of numbers of spatial streams allocated to different numbers of the apparatuses, and
the numbers of spatial streams in each of the different combinations are in a defined order.

4. The method of claim 3, further comprising:
generating a frame comprising a group identifier (ID), wherein the group ID specifies IDs assigned to the apparatuses such that the numbers of spatial streams are allocated to the apparatuses in the defined order; and
transmitting the frame to the apparatuses.

5. The method of claim 3, wherein the defined order comprises the numbers of spatial streams listed in non-increasing order.

6. The method of claim 3, wherein the defined order comprises the numbers of spatial streams listed in non-decreasing order.

7. The method of claim 1, wherein each of the apparatuses has a unique identifier (ID).

8. The method of claim 1, wherein the SIG field comprises a group identifier for a group of the apparatuses.

9. A method for wireless communications, comprising:
generating a preamble comprising a signal (SIG) field, wherein the SIG field comprises a plurality of bits that indicate a number and allocation of spatial streams for a plurality of apparatuses without explicitly identifying each apparatus; and
transmitting the preamble to the apparatuses, wherein
the plurality of bits represent a code,
different values of the code map to different combinations of numbers of spatial streams allocated to different numbers of the apparatuses, and
the code comprises one to S bits of a first value and N−1 bits of a second value, S being the number of spatial streams allocated to the apparatuses and N being the number of apparatuses.

10. The method of claim 9, wherein:
each bit of the first value represents one of the spatial streams allocated to one of the apparatuses, and
each bit of the second value represents a separator symbol to delineate allocation of the spatial streams between two of the apparatuses.

11. The method of claim 10, further comprising:
appending one or more bits of the second value to the code to obtain an extended code, wherein a length of the extended code is same for all the combinations.

12. A method for wireless communications, comprising:
generating a preamble comprising a signal (SIG) field, wherein the SIG field comprises a plurality of bits that indicate a number and allocation of spatial streams for a plurality of apparatuses without explicitly identifying each apparatus; and
transmitting the preamble to the apparatuses, wherein
the plurality of bits represent a code,
different values of the code map to different combinations of numbers of spatial streams allocated to different numbers of the apparatuses,
the combinations are enumerated as successive decimal integers, and
the different values of codes comprise binary representations of the successive decimal integers.

13. A method for wireless communications, comprising:
generating a preamble comprising a signal (SIG) field, wherein the SIG field comprises a plurality of bits that indicate a number and allocation of spatial streams for a plurality of apparatuses without explicitly identifying each apparatus; and
transmitting the preamble to the apparatuses, wherein
the plurality of bits represent a code, and
different values of the code map to different combinations of numbers of spatial streams allocated to different numbers of the apparatuses, the method further comprising:
obtaining different values of the code mapped to a subset of the combinations by encoding the subset with a first set of binary values, the subset comprising combinations where no spatial stream is allocated to at least one of the apparatuses, the first set of binary values comprising binary representations of successive decimal integers starting with zero and ending with a defined value decreased by one, the defined value is indicative of the number of combinations in the subset; and
obtaining remaining different values of the code mapped to remaining combinations by encoding the remaining combinations with a second set of binary values, the second set of binary values comprising binary representations of successive decimal integers starting with the defined value and ending with the number of all the combinations decreased by one.

14. An apparatus for wireless communications, comprising:
a first circuit configured to generate a preamble comprising a signal (SIG) field, wherein the SIG field comprises a plurality of bits that indicate a number and allocation of spatial streams for a plurality of other apparatuses without explicitly identifying each of the other apparatuses;
a second circuit configured to assign a subset of the plurality of bits to each of the other apparatuses, wherein the subset of bits assigned to each of the other apparatuses indicates a number of spatial streams allocated to that other apparatus;
a third circuit configured to order the subsets of bits to enable each of the other apparatuses to identify its associated subset based on its location in the plurality of bits; and
a transmitter configured to transmit the preamble to the other apparatuses.

15. An apparatus for wireless communications, comprising:
a first circuit configured to generate a preamble comprising a signal (SIG) field, wherein the SIG field comprises a plurality of bits that indicate a number and allocation of spatial streams for a plurality of other apparatuses without explicitly identifying each of the other apparatuses; and a transmitter configured to transmit the preamble to the other apparatuses, wherein the plurality of bits represent a code, different values of the code map to different combinations of numbers of spatial streams allocated to different numbers of the other apparatuses, and at least one code value maps to a same number of spatial streams allocated to each of the other apparatuses.

16. An apparatus for wireless communications, comprising:

a first circuit configured to generate a preamble comprising a signal (SIG) field, wherein the SIG field comprises a plurality of bits that indicate a number and allocation of spatial streams for a plurality of other apparatuses without explicitly identifying each of the other apparatuses; and a transmitter configured to transmit the preamble to the other apparatuses, wherein the plurality of bits represent a code, different values of the code map to different combinations of numbers of spatial streams allocated to different numbers of the other apparatuses, and the numbers of spatial streams in each of the different combinations are in a defined order.

17. The apparatus of claim 16, wherein:

the first circuit is also configured to generate a frame comprising a group identifier (ID), wherein the group ID specifies IDs assigned to the other apparatuses such that the numbers of spatial streams are allocated to the other apparatuses in the defined order, and the transmitter is also configured to transmit the frame to the other apparatuses.

18. The apparatus of claim 16, wherein the defined order comprises the numbers of spatial streams listed in non-increasing order.

19. The apparatus of claim 16, wherein the defined order comprises the numbers of spatial streams listed in non-decreasing order.

20. The apparatus of claim 14, wherein each of the other apparatuses has a unique identifier (ID).

21. The apparatus of claim 14, wherein the SIG field comprises a group identifier for a group of the other apparatuses.

22. An apparatus for wireless communications, comprising:

a first circuit configured to generate a preamble comprising a signal (SIG) field, wherein the SIG field comprises a plurality of bits that indicate a number and allocation of spatial streams for a plurality of other apparatuses without explicitly identifying each of the other apparatuses; and a transmitter configured to transmit the preamble to the other apparatuses, wherein the plurality of bits represent a code, different values of the code map to different combinations of numbers of spatial streams allocated to different numbers of the other apparatuses, and the code comprises one to S bits of a first value and N−1 bits of a second value, S being the number of spatial streams allocated to the other apparatuses and N being the number of other apparatuses.

23. The apparatus of claim 22, wherein:

each bit of the first value represents one of the spatial streams allocated to one of the other apparatuses, and each bit of the second value represents a separator symbol to delineate allocation of the spatial streams between two of the other apparatuses.

24. The apparatus of claim 23, further comprising:

an appending circuit configured to append one or more bits of the second value to the code to obtain an extended code, wherein a length of the extended code is same for all the combinations.

25. An apparatus for wireless communications, comprising:

a first circuit configured to generate a preamble comprising a signal (SIG) field, wherein the SIG field comprises a plurality of bits that indicate a number and allocation of spatial streams for a plurality of other apparatuses without explicitly identifying each of the other apparatuses; and a transmitter configured to transmit the preamble to the other apparatuses, wherein the plurality of bits represent a code, different values of the code map to different combinations of numbers of spatial streams allocated to different numbers of the other apparatuses, the combinations are enumerated as successive decimal integers, and the different values of codes comprise binary representations of the successive decimal integers.

26. An apparatus for wireless communications, comprising:

a first circuit configured to generate a preamble comprising a signal (SIG) field, wherein the SIG field comprises a plurality of bits that indicate a number and allocation of spatial streams for a plurality of other apparatuses without explicitly identifying each of the other apparatuses; and a transmitter configured to transmit the preamble to the other apparatuses, wherein the plurality of bits represent a code, and different values of the code map to different combinations of numbers of spatial streams allocated to different numbers of other the apparatuses, the apparatus further comprising:

an encoder configured to obtain different values of the code mapped to a subset of the combinations by encoding the subset with a first set of binary values, the subset comprising combinations where no spatial stream is allocated to at least one of the other apparatuses, the first set of binary values comprising binary representations of successive decimal integers starting with zero and ending with a defined value decreased by one, the defined value is indicative of the number of combinations in the subset, and wherein the encoder is also configured to obtain remaining different values of the code mapped to remaining combinations by encoding the remaining combinations with a second set of binary values, the second set of binary values comprising binary representations of successive decimal integers starting with the defined value and ending with the number of all the combinations decreased by one.

27. An apparatus for wireless communications, comprising:

means for generating a preamble comprising a signal (SIG) field, wherein the SIG field comprises a plurality of bits that indicate a number and allocation of spatial streams for a plurality of other apparatuses without explicitly identifying each of the other apparatuses;

means for assigning a subset of the plurality of bits to each of the other apparatuses, wherein the subset of bits assigned to each of the other apparatuses indicates a number of spatial streams allocated to that other apparatus;

means for ordering the subsets of bits to enable each of the other apparatuses to identify its associated subset based on its location in the plurality of bits; and means for transmitting the preamble to the other apparatuses.

28. An apparatus for wireless communications, comprising:

means for generating a preamble comprising a signal (SIG) field, wherein the SIG field comprises a plurality of bits that indicate a number and allocation of spatial streams for a plurality of other apparatuses without explicitly identifying each of the other apparatuses; and means for transmitting the preamble to the other apparatuses, wherein the plurality of bits represent a code, different values of the code map to different combinations of numbers of spatial streams allocated to different numbers of the other apparatuses, and at least one code value maps to a same number of spatial streams allocated to each of the other apparatuses.

29. An apparatus for wireless communications, comprising:

means for generating a preamble comprising a signal (SIG) field, wherein the SIG field comprises a plurality of bits that indicate a number and allocation of spatial streams for a plurality of other apparatuses without explicitly identifying each of the other apparatuses; and means for transmitting the preamble to the other apparatuses, wherein the plurality of bits represent a code, different values of the code map to different combinations of numbers of spatial streams allocated to different numbers of the other apparatuses, and the numbers of spatial streams in each of the different combinations are in a defined order.

30. The apparatus of claim 29, further comprising:

means for generating a frame comprising a group identifier (ID), wherein the group ID specifies IDs assigned to the other apparatuses such that the numbers of spatial streams are allocated to the other apparatuses in the defined order, wherein the means for transmitting is further configured to transmit the frame to the other apparatuses.

31. The apparatus of claim 29, wherein the defined order comprises the numbers of spatial streams listed in non-increasing order.

32. The apparatus of claim 29, wherein the defined order comprises the numbers of spatial streams listed in non-decreasing order.

33. The apparatus of claim 27, wherein each of the other apparatuses has a unique identifier (ID).

34. The apparatus of claim 27, wherein the SIG field comprises a group identifier for a group of the other apparatuses.

35. An apparatus for wireless communications, comprising:

means for generating a preamble comprising a signal (SIG) field, wherein the SIG field comprises a plurality of bits that indicate a number and allocation of spatial streams for a plurality of other apparatuses without explicitly identifying each of the other apparatuses; and means for transmitting the preamble to the other apparatuses, wherein the plurality of bits represent a code, different values of the code map to different combinations of numbers of spatial streams allocated to different numbers of the other apparatuses, and the code comprises one to S bits of a first value and N−1 bits of a second value, S being the number of spatial streams allocated to the other apparatuses and N being the number of other apparatuses.

36. The apparatus of claim 35, wherein:

each bit of the first value represents one of the spatial streams allocated to one of the other apparatuses, and each bit of the second value represents a separator symbol to delineate allocation of the spatial streams between two of the other apparatuses.

37. The apparatus of claim 36, further comprising:

means for appending one or more bits of the second value to the code to obtain an extended code, wherein a length of the extended code is same for all the combinations.

38. An apparatus for wireless communications, comprising:

means for generating a preamble comprising a signal (SIG) field, wherein the SIG field comprises a plurality of bits that indicate a number and allocation of spatial streams for a plurality of other apparatuses without explicitly identifying each of the other apparatuses; and means for transmitting the preamble to the other apparatuses, wherein the plurality of bits represent a code, different values of the code map to different combinations of numbers of spatial streams allocated to different numbers of the other apparatuses, the combinations are enumerated as successive decimal integers, and the different values of codes comprise binary representations of the successive decimal integers.

39. An apparatus for wireless communications, comprising:

means for generating a preamble comprising a signal (SIG) field, wherein the SIG field comprises a plurality of bits that indicate a number and allocation of spatial streams for a plurality of other apparatuses without explicitly identifying each of the other apparatuses; and means for transmitting the preamble to the other apparatuses, wherein the plurality of bits represent a code, and different values of the code map to different combinations of numbers of spatial streams allocated to different numbers of the other apparatuses, the apparatus further comprising means for obtaining different values of the code mapped to a subset of the combinations by encoding the subset with a first set of binary values, the subset comprising combinations where no spatial stream is allocated to at least one of the other apparatuses, the first set of binary values comprising binary representations of successive decimal integers starting with zero and ending with a defined value decreased by one, the defined value is indicative of the number of combinations in the subset; and means for obtaining remaining different values of the code mapped to remaining combinations by encoding the remaining combinations with a second set of binary values, the second set of binary values comprising binary representations of successive decimal integers starting with the defined value and ending with the number of all the combinations decreased by one.

40. A computer-program product for wireless communications, comprising a computer-readable tangible storage medium encoded with instructions executable to:
- generate a preamble comprising a signal (SIG) field, wherein the SIG field comprises a plurality of bits that indicate a number and allocation of spatial streams for a plurality of apparatuses without explicitly identifying each apparatus;
- assign a subset of the plurality of bits to each apparatus, wherein the subset of bits assigned to each apparatus indicates a number of spatial streams allocated to that apparatus;
- order the subsets of bits to enable each apparatus to identify its associated subset based on its location in the plurality of bits; and
- transmit the preamble to the apparatuses.

41. An access point, comprising:
- at least one antenna;
- a first circuit configured to generate a preamble comprising a signal (SIG) field, wherein the SIG field comprises a plurality of bits that indicate a number and allocation of spatial streams for a plurality of wireless nodes without explicitly identifying each wireless node;
- a second circuit configured to assign a subset of the plurality of bits to each of the wireless nodes, wherein the subset of bits assigned to each of the wireless nodes indicates a number of spatial streams allocated to that wireless node;
- a third circuit configured to order the subsets of bits to enable each wireless node to identify its associated subset based on its location in the plurality of bits; and
- a transmitter configured to transmit the preamble to the wireless nodes via the at least one antenna.

42. A method for wireless communications, comprising:
- receiving, at an apparatus, a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus;
- assigning a subset of the plurality of bits to each apparatus, wherein the subset of bits assigned to each apparatus indicates a number of spatial streams allocated to that apparatus;
- ordering the subsets of bits to enable each apparatus to identify its associated subset based on its location in the plurality of bits; and
- determining, based on the plurality of bits, which spatial streams are allocated to the apparatus.

43. A method for wireless communications, comprising:
- receiving, at an apparatus, a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus; and
- determining, based on the plurality of bits, which spatial streams are allocated to the apparatus, wherein
- the plurality of bits represent a code,
- different values of the code map to different combinations of numbers of spatial streams allocated to different numbers of the apparatuses, and
- at least one code value maps to a same number of spatial streams allocated to each of the apparatuses.

44. A method for wireless communications, comprising:
- receiving, at an apparatus, a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus; and
- determining, based on the plurality of bits, which spatial streams are allocated to the apparatus, wherein
- the plurality of bits represent a code,
- different values of the code map to different combinations of numbers of spatial streams allocated to different numbers of the apparatuses, and
- the numbers of spatial streams in each of the different combinations are in a defined order.

45. The method of claim 44, further comprising:
- receiving, at the apparatus, a frame transmitted to the apparatus and to the other apparatuses, said frame comprising a group identifier (ID),
- wherein the group ID specifies IDs assigned to the apparatuses such that the numbers of spatial streams are allocated to the apparatuses in the defined order.

46. The method of claim 44, wherein the defined order comprises the numbers of spatial streams listed in non-increasing order.

47. The method of claim 44, wherein the defined order comprises the numbers of spatial streams listed in non-decreasing order.

48. The method of claim 42, further comprising:
- receiving a packet on the spatial streams allocated to the apparatus;
- decoding the received packet; and
- discarding the decoded packet, if a Media Access Control (MAC) address associated with the packet is different than a MAC address associated with the apparatus.

49. A method for wireless communications, comprising:
- receiving, at an apparatus, a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus; and
- determining, based on the plurality of bits, which spatial streams are allocated to the apparatus, wherein
- the plurality of bits represent a code,
- different values of the code map to different combinations of numbers of spatial streams allocated to different numbers of the apparatuses, and
- the code comprises one to S bits of a first value and N−1 bits of a second value, S being the number of spatial streams allocated to the apparatuses and N being the number of apparatuses.

50. The method of claim 49, wherein:
- each bit of the first value represents one of the spatial streams allocated to one of the apparatuses, and
- each bit of the second value represents a separator symbol to delineate allocation of the spatial streams between two of the apparatuses.

51. The method of claim 50, wherein one or more bits of the second value are appended to the code to obtain an extended code, wherein a length of the extended code is same for all the combinations.

52. A method for wireless communications, comprising:
- receiving, at an apparatus, a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus; and determining, based on the plurality of bits, which spatial streams are allocated to the apparatus, wherein
the plurality of bits represent a code,
different values of the code map to different combinations of numbers of spatial streams allocated to different numbers of the apparatuses,
the combinations are enumerated as successive decimal integers, and
the different values of codes comprise binary representations of the successive decimal integers.

53. A method for wireless communications, comprising:
receiving, at an apparatus, a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus; and
determining, based on the plurality of bits, which spatial streams are allocated to the apparatus, wherein
the plurality of bits represent a code,
different values of the code map to different combinations of numbers of spatial streams allocated to different numbers of the apparatuses,
different values of the code mapped to a subset of the combinations are obtained by encoding the subset with a first set of binary values, the subset comprising combinations where no spatial stream is allocated to at least one of the apparatuses, the first set of binary values comprising binary representations of successive decimal integers starting with zero and ending with a defined value decreased by one, the defined value is indicative of the number of combinations in the subset, and
remaining different values of the code mapped to remaining combinations are obtained by encoding the remaining combinations with a second set of binary values, the second set of binary values comprising binary representations of successive decimal integers starting with the defined value and ending with the number of all the combinations decreased by one.

54. An apparatus for wireless communications, comprising:
a receiver configured to receive a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus;
a circuit configured to determine, based on the plurality of bits, which spatial streams are allocated to the apparatus;
a second circuit configured to assign a subset of the plurality of bits to each apparatus of the plurality of apparatuses, wherein the subset of bits assigned to each apparatus of the plurality of apparatuses indicates a number of spatial streams allocated to that apparatus; and
a third circuit configured to order the subsets of bits to enable each apparatus to identify its associated subset based on its location in the plurality of bits.

55. An apparatus for wireless communications, comprising:
a receiver configured to receive a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus; and a circuit configured to determine, based on the plurality of bits, which spatial streams are allocated to the apparatus, wherein
the plurality of bits represent a code,
different values of the code map to different combinations of numbers of spatial streams allocated to different numbers of the apparatuses, and
at least one code value maps to a same number of spatial streams allocated to each of the apparatuses.

56. An apparatus for wireless communications, comprising:
a receiver configured to receive a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus; and
a circuit configured to determine, based on the plurality of bits, which spatial streams are allocated to the apparatus, wherein
the plurality of bits represent a code,
different values of the code map to different combinations of numbers of spatial streams allocated to different numbers of the apparatuses, and
the numbers of spatial streams in each of the different combinations are in a defined order.

57. The apparatus of claim 56, wherein:
the receiver is also configured to receive a frame transmitted to the apparatus and to the other apparatuses, said frame comprising a group identifier (ID), and
the group ID specifies IDs assigned to the apparatuses such that the numbers of spatial streams are allocated to the apparatuses in the defined order.

58. The apparatus of claim 56, wherein the defined order comprises the numbers of spatial streams listed in non-increasing order.

59. The apparatus of claim 56, wherein the defined order comprises the numbers of spatial streams listed in non-decreasing order.

60. The apparatus of claim 54, wherein the receiver is also configured to receive a packet on the spatial streams allocated to the apparatus, and the apparatus further comprising:
a decoder configured to decode the received packet; and
another circuit configured to discard the decoded packet, if a Media Access Control (MAC) address associated with the packet is different than a MAC address associated with the apparatus.

61. An apparatus for wireless communications, comprising:
a receiver configured to receive a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus; and
a circuit configured to determine, based on the plurality of bits, which spatial streams are allocated to the apparatus, wherein
the plurality of bits represent a code,
different values of the code map to different combinations of numbers of spatial streams allocated to different numbers of the apparatuses, and
the code comprises one to S bits of a first value and N−1 bits of a second value, S being the number of spatial streams allocated to the apparatuses and N being the number of apparatuses.

62. The apparatus of claim 61, wherein:
- each bit of the first value represents one of the spatial streams allocated to one of the apparatuses, and
- each bit of the second value represents a separator symbol to delineate allocation of the spatial streams between two of the apparatuses.

63. The apparatus of claim 62, wherein one or more bits of the second value are appended to the code to obtain an extended code, wherein a length of the extended code is same for all the combinations.

64. An apparatus for wireless communications, comprising:
- a receiver configured to receive a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus; and
- a circuit configured to determine, based on the plurality of bits, which spatial streams are allocated to the apparatus, wherein
- the plurality of bits represent a code,
- different values of the code map to different combinations of numbers of spatial streams allocated to different numbers of the apparatuses,
- the combinations are enumerated as successive decimal integers, and
- the different values of codes comprise binary representations of the successive decimal integers.

65. An apparatus for wireless communications, comprising:
- a receiver configured to receive a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus; and
- a circuit configured to determine, based on the plurality of bits, which spatial streams are allocated to the apparatus, wherein
- the plurality of bits represent a code,
- different values of the code map to different combinations of numbers of spatial streams allocated to different numbers of the apparatuses,
- different values of the code mapped to a subset of the combinations are obtained by encoding the subset with a first set of binary values, the subset comprising combinations where no spatial stream is allocated to at least one of the apparatuses, the first set of binary values comprising binary representations of successive decimal integers starting with zero and ending with a defined value decreased by one, the defined value is indicative of the number of combinations in the subset, and
- remaining different values of the code mapped to remaining combinations are obtained by encoding the remaining combinations with a second set of binary values, the second set of binary values comprising binary representations of successive decimal integers starting with the defined value and ending with the number of all the combinations decreased by one.

66. An apparatus for wireless communications, comprising:
- means for receiving a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus;
- means for determining, based on the plurality of bits, which spatial streams are allocated to the apparatus;
- means for assigning a subset of the plurality of bits to each apparatus of the plurality of apparatuses, wherein the subset of bits assigned to each apparatus of the plurality of apparatuses indicates a number of spatial streams allocated to that apparatus; and
- means for ordering the subsets of bits to enable each apparatus to identify its associated subset based on its location in the plurality of bits.

67. An apparatus for wireless communications, comprising:
- means for receiving a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus; and
- means for determining, based on the plurality of bits, which spatial streams are allocated to the apparatus, wherein
- the plurality of bits represent a code,
- different values of the code map to different combinations of numbers of spatial streams allocated to different numbers of the apparatuses, and
- at least one code value maps to a same number of spatial streams allocated to each of the apparatuses.

68. An apparatus for wireless communications, comprising:
- means for receiving a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus; and
- means for determining, based on the plurality of bits, which spatial streams are allocated to the apparatus, wherein
- the plurality of bits represent a code,
- different values of the code map to different combinations of numbers of spatial streams allocated to different numbers of the apparatuses, and
- the numbers of spatial streams in each of the different combinations are in a defined order.

69. The apparatus of claim 68, wherein:
- the means for receiving is further configured to receive a frame transmitted to the apparatus and to the other apparatuses, said frame comprising a group identifier (ID), and
- wherein the group ID specifies IDs assigned to the apparatuses such that the numbers of spatial streams are allocated to the apparatuses in the defined order.

70. The apparatus of claim 68, wherein the defined order comprises the numbers of spatial streams listed in non-increasing order.

71. The apparatus of claim 68, wherein the defined order comprises the numbers of spatial streams listed in non-decreasing order.

72. The apparatus of claim 66, wherein:
- the means for receiving is further configured to receive a packet on the spatial streams allocated to the apparatus, and the apparatus further comprising:
- means for decoding the received packet; and means for discarding the decoded packet, if a Media Access Control (MAC) address associated with the packet is different than a MAC address associated with the apparatus.

73. An apparatus for wireless communications, comprising:
means for receiving a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus; and
means for determining, based on the plurality of bits, which spatial streams are allocated to the apparatus, wherein
the plurality of bits represent a code,
different values of the code map to different combinations of numbers of spatial streams allocated to different numbers of the apparatuses, and
the code comprises one to S bits of a first value and N−1 bits of a second value, S being the number of spatial streams allocated to the apparatuses and N being the number of apparatuses.

74. The apparatus of claim 73, wherein:
each bit of the first value represents one of the spatial streams allocated to one of the apparatuses, and
each bit of the second value represents a separator symbol to delineate allocation of the spatial streams between two of the apparatuses.

75. The apparatus of claim 74, wherein one or more bits of the second value are appended to the code to obtain an extended code, wherein a length of the extended code is same for all the combinations.

76. An apparatus for wireless communications, comprising:
means for receiving a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus; and
means for determining, based on the plurality of bits, which spatial streams are allocated to the apparatus, wherein
the plurality of bits represent a code,
different values of the code map to different combinations of numbers of spatial streams allocated to different numbers of the apparatuses,
the combinations are enumerated as successive decimal integers, and
the different values of codes comprise binary representations of the successive decimal integers.

77. An apparatus for wireless communications, comprising:
means for receiving a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus; and
means for determining, based on the plurality of bits, which spatial streams are allocated to the apparatus, wherein
the plurality of bits represent a code,
different values of the code map to different combinations of numbers of spatial streams allocated to different numbers of the apparatuses,
different values of the code mapped to a subset of the combinations are obtained by encoding the subset with a first set of binary values, the subset comprising combinations where no spatial stream is allocated to at least one of the apparatuses, the first set of binary values comprising binary representations of successive decimal integers starting with zero and ending with a defined value decreased by one, the defined value is indicative of the number of combinations in the subset, and
remaining different values of the code mapped to remaining combinations are obtained by encoding the remaining combinations with a second set of binary values, the second set of binary values comprising binary representations of successive decimal integers starting with the defined value and ending with the number of all the combinations decreased by one.

78. A computer-program product for wireless communications, comprising a computer-readable tangible storage medium encoded with instructions executable to:
receive, at an apparatus, a preamble transmitted to the apparatus and to other apparatuses, said preamble comprising a signal (SIG) field, wherein the SIG field comprises a plurality of bits that indicate a number and allocation of spatial streams for a plurality of apparatuses without explicitly identifying each apparatus;
assign a subset of the plurality of bits to each apparatus, wherein the subset of bits assigned to each apparatus indicates a number of spatial streams allocated to that apparatus;
order the subsets of bits to enable each apparatus to identify its associated subset based on its location in the plurality of bits; and
determine, based on the plurality of bits, which spatial streams are allocated to the apparatus.

79. A wireless node, comprising:
at least one antenna;
a receiver configured to receive, via the at least one antenna, a preamble transmitted to the wireless node and to other wireless nodes, said preamble comprising a signal (SIG) field, wherein the SIG field comprises a plurality of bits that indicate a number and allocation of spatial streams for a plurality of wireless nodes without explicitly identifying each wireless node;
a circuit configured to determine, based on the plurality of bits, which spatial streams are allocated to the wireless node;
a second circuit configured to assign a subset of the plurality of bits to each wireless node of the plurality of wireless nodes, wherein the subset of bits assigned to each wireless node of the plurality of wireless nodes indicates a number of spatial streams allocated to that wireless node; and
a third circuit configured to order the subsets of bits to enable each wireless node to identify its associated subset based on its location in the plurality of bits.

80. A method for wireless communications, comprising:
generating, at an apparatus, a frame comprising a plurality of identifiers (IDs), wherein the plurality of IDs are assigned to a plurality of apparatuses; and
transmitting the frame to the apparatuses, wherein
each of the IDs assigned to one of the apparatuses is selected from a defined number of unique IDs, and
the defined number of unique IDs is equal to a maximum number of apparatuses simultaneously supported by a Spatial Division Multiple Access (SDMA) transmission from the apparatus.

81. The method of claim 80, wherein the plurality of IDs comprise an ID for each access class.

82. A method for wireless communications, comprising:
generating, at an apparatus, a frame comprising a plurality of identifiers (IDs), wherein the plurality of IDs are assigned to a plurality of apparatuses;
transmitting the frame to the apparatuses;
generating another frame comprising a different plurality of IDs, wherein the different plurality of IDs is assigned to the plurality of apparatuses; and
transmitting the other frame to the apparatuses.

83. The method of claim 82, wherein a group ID specifies the different plurality of IDs assigned to the plurality of apparatuses.

84. A method for wireless communications, comprising:
generating, at an apparatus, a frame comprising a plurality of identifiers (IDs), wherein the plurality of IDs are assigned to a plurality of apparatuses; and
transmitting the frame to the apparatuses, wherein
the frame comprises a group ID,
the group ID defines the IDs assigned to the apparatuses such that numbers of spatial streams are allocated to the apparatuses in a defined order, and
the defined order comprises the numbers of spatial streams listed in non-increasing order.

85. A method for wireless communications, comprising:
generating, at an apparatus, a frame comprising a plurality of identifiers (IDs), wherein the plurality of IDs are assigned to a plurality of apparatuses; and
transmitting the frame to the apparatuses, wherein
the frame comprises a group ID,
the group ID defines the IDs assigned to the apparatuses such that numbers of spatial streams are allocated to the apparatuses in a defined order, and
the defined order comprises the numbers of spatial streams listed in non-decreasing order.

86. An apparatus for wireless communications, comprising:
a circuit configured to generate a frame comprising a plurality of identifiers (IDs), wherein the plurality of IDs are assigned to a plurality of apparatuses; and
a transmitter configured to transmit the frame to the apparatuses, wherein
each of the IDs assigned to one of the apparatuses is selected from a defined number of unique IDs, and
the defined number of unique IDs is equal to a maximum number of apparatuses simultaneously supported by a Spatial Division Multiple Access (SDMA) transmission from the apparatus.

87. The apparatus of claim 86, wherein the plurality of IDs comprise an ID for each access class.

88. An apparatus for wireless communications, comprising:
a circuit configured to generate a frame comprising a plurality of identifiers (IDs), wherein the plurality of IDs are assigned to a plurality of apparatuses; and
a transmitter configured to transmit the frame to the apparatuses, wherein:
the circuit is also configured to generate another frame comprising a different plurality of IDs,
the different plurality of IDs is assigned to the plurality of apparatuses, and
the transmitter is also configured to transmit the other frame to the apparatuses.

89. The apparatus of claim 88, wherein a group ID specifies the different plurality of IDs assigned to the plurality of apparatuses.

90. An apparatus for wireless communications, comprising:
a circuit configured to generate a frame comprising a plurality of identifiers (IDs), wherein the plurality of IDs are assigned to a plurality of apparatuses; and
a transmitter configured to transmit the frame to the apparatuses, wherein
the frame comprises a group ID,
the group ID defines the IDs assigned to the apparatuses such that numbers of spatial streams are allocated to the apparatuses in a defined order, and
the defined order comprises the numbers of spatial streams listed in non-increasing order.

91. An apparatus for wireless communications, comprising:
a circuit configured to generate a frame comprising a plurality of identifiers (IDs), wherein the plurality of IDs are assigned to a plurality of apparatuses; and
a transmitter configured to transmit the frame to the apparatuses, wherein
the frame comprises a group ID,
the group ID defines the IDs assigned to the apparatuses such that numbers of spatial streams are allocated to the apparatuses in a defined order, and
the defined order comprises the numbers of spatial streams listed in non-decreasing order.

92. An apparatus for wireless communications, comprising:
means for generating a frame comprising a plurality of identifiers (IDs), wherein the plurality of IDs are assigned to a plurality of apparatuses; and
means for transmitting the frame to the apparatuses, wherein
each of the IDs assigned to one of the apparatuses is selected from a defined number of unique IDs, and
the defined number of unique IDs is equal to a maximum number of apparatuses simultaneously supported by a Spatial Division Multiple Access (SDMA) transmission from the apparatus.

93. The apparatus of claim 92, wherein the plurality of IDs comprise an ID for each access class.

94. An apparatus for wireless communications, comprising:
means for generating a frame comprising a plurality of identifiers (IDs), wherein the plurality of IDs are assigned to a plurality of apparatuses;
means for transmitting the frame to the apparatuses; and
means for generating another frame comprising a different plurality of IDs, wherein
the different plurality of IDs is assigned to the plurality of apparatuses, and
the means for transmitting is further configured to transmit the other frame to the apparatuses.

95. The apparatus of claim 94, wherein a group ID specifies the different plurality of IDs assigned to the plurality of apparatuses.

96. An apparatus for wireless communications, comprising:
means for generating a frame comprising a plurality of identifiers (IDs), wherein the plurality of IDs are assigned to a plurality of apparatuses; and
means for transmitting the frame to the apparatuses, wherein
the frame comprises a group ID,
the group ID defines the IDs assigned to the apparatuses such that numbers of spatial streams are allocated to the apparatuses in a defined order, and the defined order comprises the numbers of spatial streams listed in non-increasing order.

97. An apparatus for wireless communications, comprising:
means for generating a frame comprising a plurality of identifiers (IDs), wherein the plurality of IDs are assigned to a plurality of apparatuses; and
means for transmitting the frame to the apparatuses, wherein
the frame comprises a group ID,
the group ID defines the IDs assigned to the apparatuses such that numbers of spatial streams are allocated to the apparatuses in a defined order, and
the defined order comprises the numbers of spatial streams listed in non-decreasing order.

98. A computer-program product for wireless communications, comprising a computer-readable tangible storage medium encoded with instructions executable to:
generate, at an apparatus, a frame comprising a plurality of identifiers (IDs), wherein the plurality of IDs are assigned to a plurality of apparatuses; and
transmit the frame to the apparatuses, wherein
each of the IDs assigned to one of the apparatuses is selected from a defined number of unique IDs, and
the defined number of unique IDs is equal to a maximum number of apparatuses simultaneously supported by a Spatial Division Multiple Access (SDMA) transmission from the apparatus.

99. An access point, comprising:
at least one antenna;
a circuit configured to generate a frame comprising a plurality of identifiers (IDs), wherein the plurality of IDs are assigned to a plurality of wireless nodes; and
a transmitter configured to transmit the frame to the wireless nodes via the at least one antenna, wherein
each of the IDs assigned to one of the wireless nodes is selected from a defined number of unique IDs, and
the defined number of unique IDs is equal to a maximum number of wireless nodes simultaneously supported by a Spatial Division Multiple Access (SDMA) transmission from the access point.

* * * * *